US 11,053,914 B2

(12) United States Patent
Yáñez Villareal

(10) Patent No.: US 11,053,914 B2
(45) Date of Patent: Jul. 6, 2021

(54) ELECTRICAL POWER GENERATOR FOR PRODUCING OSCILLATING MOVEMENT OF A STRUCTURE AND CONVERTING OSCILLATING MOVEMENT INTO ELECTRICAL ENERGY

(71) Applicant: VORTEX BLADELESS, S.L., Madrid (ES)

(72) Inventor: David Jesús Yáñez Villareal, Ávila (ES)

(73) Assignee: VORTEX BLADELESS, S.L., Madrid (ES)

( * ) Notice: Subject to any disclaimer, the term of this patent is extended or adjusted under 35 U.S.C. 154(b) by 0 days.

(21) Appl. No.: 16/086,957

(22) PCT Filed: Apr. 5, 2017

(86) PCT No.: PCT/EP2017/058166
§ 371 (c)(1),
(2) Date: Sep. 20, 2018

(87) PCT Pub. No.: WO2017/174685
PCT Pub. Date: Oct. 12, 2017

(65) Prior Publication Data
US 2019/0101100 A1    Apr. 4, 2019

(30) Foreign Application Priority Data

Apr. 7, 2016 (EP) ..................................... 16382155

(51) Int. Cl.
*F03D 5/06* (2006.01)
*H02K 35/00* (2006.01)
*F03G 7/00* (2006.01)

(52) U.S. Cl.
CPC ................. *F03D 5/06* (2013.01); *F03G 7/00* (2013.01); *F05B 2210/16* (2013.01); *Y02E 10/70* (2013.01)

(58) Field of Classification Search
CPC ..... F03D 5/06; F03G 3/00; F03G 3/08; F03G 7/00; F03G 7/10; F05B 2210/16;
(Continued)

(56) References Cited

U.S. PATENT DOCUMENTS 6,831,374 B2 * 12/2004 Seki .......................... F03D 7/06
290/44
6,876,094 B2 * 4/2005 Jacobsen ................. F02B 63/04
290/1 R
(Continued)

FOREIGN PATENT DOCUMENTS

DE          495303 C   *  4/1930    ............... F03D 5/06
DE          495303 C      4/1930
(Continued)

OTHER PUBLICATIONS

Kundu et al. (2008). Chapter 10: Boundary Layers and Related Topics. Fluid Mechanics (4th ed., pp. 363-376). © Elsevier Inc. 2008. (Year: 2008).*
(Continued)

*Primary Examiner* — Tulsidas C Patel
*Assistant Examiner* — S. Mikailoff
(74) *Attorney, Agent, or Firm* — Cantor Colburn LLP

(57) ABSTRACT

An electrical power generator includes a first part having an elongated shape, a first end and a second end. The first part is arranged for attachment to a base in correspondence with the first end and configured to be located in a fluid and configured such that, when said fluid moves, the first part generates vortices in said fluid so that a lift force is generated on the first part, which produces an oscillating movement of
(Continued)

the first part. In addition, the generator includes a subsystem configured for converting the oscillating movement of the first part into electrical energy. The subsystem is at least partially housed within the first part.

10 Claims, 11 Drawing Sheets

(58) Field of Classification Search
CPC ........ H01F 7/0236; H02K 35/02; H02K 7/09; H02N 15/00; H02N 2/181; H02N 2/185; Y02E 10/70
See application file for complete search history.

(56) References Cited

U.S. PATENT DOCUMENTS

| | | | | |
|---|---|---|---|---|
| 7,199,480 | B2* | 4/2007 | Fripp | E21B 41/0085 290/1 R |
| 7,208,845 | B2* | 4/2007 | Masters | H02K 7/1892 290/1 R |
| 7,224,077 | B2* | 5/2007 | Allen | F03D 5/00 290/1 R |
| 7,812,466 | B2* | 10/2010 | Lu | H02N 2/188 290/1 R |
| 8,497,595 | B1* | 7/2013 | Petner | F03D 5/06 290/55 |
| 9,444,372 | B2* | 9/2016 | Yanez Villarreal | F03D 5/06 |
| 9,856,854 | B2* | 1/2018 | Yanez Villarreal | F03D 5/06 |
| 2005/0230973 | A1* | 10/2005 | Fripp | E21B 41/0085 290/1 R |
| 2005/0230974 | A1* | 10/2005 | Masters | H02K 7/1892 290/1 R |
| 2006/0064972 | A1* | 3/2006 | Allen | F03D 5/00 60/369 |
| 2007/0176430 | A1* | 8/2007 | Hammig | F03B 17/06 290/54 |
| 2008/0048455 | A1* | 2/2008 | Carney | F03D 5/00 290/54 |
| 2008/0277941 | A1* | 11/2008 | Bowles | E21B 41/0085 290/54 |
| 2012/0211990 | A1* | 8/2012 | Davey | F03B 13/264 290/54 |
| 2013/0119826 | A1* | 5/2013 | Yanez Villarreal | F03D 5/06 310/339 |
| 2014/0175800 | A1* | 6/2014 | Thorp | F03D 5/00 290/55 |
| 2016/0013737 | A1* | 1/2016 | Yanez Villarreal | H02N 2/185 310/339 |
| 2016/0356264 | A1* | 12/2016 | Yanez Villarreal | F03D 5/06 |
| 2017/0268483 | A1* | 9/2017 | Kim | F03D 5/06 |
| 2017/0284365 | A1* | 10/2017 | Yanez Villarreal | F03D 5/06 |
| 2018/0328337 | A1* | 11/2018 | Sichman | F03B 17/06 |
| 2019/0101100 | A1* | 4/2019 | Yanez Villareal | F03G 7/00 |
| 2020/0049130 | A1* | 2/2020 | Yanez Villarreal | H02K 7/1892 |

FOREIGN PATENT DOCUMENTS

| | | | |
|---|---|---|---|
| EP | 2602483 | A1 | 6/2013 |
| FR | 2922607 | A1 | 4/2009 |
| JP | 2003164136 | A | 6/2003 |
| JP | 2006132397 | A | 5/2006 |
| JP | 2006158113 | A | 6/2006 |
| JP | 2006226221 | A | 8/2006 |
| JP | 2012151982 | A | 8/2012 |
| JP | 2012151985 | A | 8/2012 |
| WO | 2012017106 | A1 | 2/2012 |
| WO | 2012066550 | A1 | 5/2012 |
| WO | 2014135551 | A1 | 9/2014 |
| WO | WO-2014135551 | A1 * | 9/2014 ............ H02N 2/185 |
| WO | 2016055370 | A2 | 4/2016 |

OTHER PUBLICATIONS

Irwin, P. (2010). Vortices and tall buildings, Physics Today, vol. 63, No. 9, pp. 68-69. © American Institute of Physics. (Year: 2010).*
Fezai et al. (2016). Obstacle Geometry Effect on the Stability of Two-Dimensional Incompressible Flow in a Channel. Journal of Applied Fluid Mechanics, vol. 9, No. 2, pp. 625-633. (Year: 2016).*
International Search Report dated Jul. 4, 2017 re: Application No. PCT/EP2017/058166, pp. 1-4, citing: DE 495 303 C, US 2013/119826 A1, Vortex Bladeless "Yellow Model Geometry", Vortex Bladeless "Red Vortex . . . ".
Written Opinion dated Jul. 4, 2017 re: Application No. PCT/EP2017/058166, pp. 1-6, citing: DE 495 303 C, US 2013/119826 A1, Vortex Bladeless "Yellow Model Geometry", Vortex Bladeless "Red Vortex . . . ".
Vortex Bladeless: "Yellow Model Geometry", Mar. 23, 2016, pp. 1, XP054977013, URL: https://www.youtube.com/watch?v=9QH2IFH10jQ.
Vortex Bladeless: "Red Vortex in the Wind Tunnel"; Mar. 23, 2016, pp. 1, XP054977009, URL: https://www.youtube.com/watch?v=22fPokCT-QU.
JP Office Action dated Mar. 18, 2021, re: Application No. 2018-550412, pp. 1-12, citing: JP 2013-535613 A, US 2016/0013737 A1, JP 2003-164136 A and DE 495303 C.

* cited by examiner

ELECTRICAL POWER GENERATOR FOR PRODUCING OSCILLATING MOVEMENT OF A STRUCTURE AND CONVERTING OSCILLATING MOVEMENT INTO ELECTRICAL ENERGY

TECHNICAL FIELD

The disclosure pertains to the field of renewable energies and more specifically to the field of electrical power generation based on the von Karman vortices.

BACKGROUND

Due to the drawbacks of non-renewable energies, such as those based on the combustion of fossil fuels or nuclear energy, major efforts have been made to develop so-called renewable energies such as solar and wind power.

So far, the most wide-spread wind power generator may be the multi-blade horizontal axis wind turbine. Here, the wind causes rotation of a rotor with multiple blades, and this rotor is connected to the rotor of an electrical generator or alternator, sometimes through a gear-box. Thus, the wind is used to rotate a multi-blade rotor, typically a three-blade rotor, arranged to rotate the rotor of the alternator so as to produce electrical power. A drawback with this kind of wind turbine is the large number of moving parts, many of which are rotatably arranged by more or less sophisticated bearings. Thus, the maintenance costs can be substantial due to, for example, wear of components, consumption of lubricants, etc. Additionally, in some cases, the high speed of the blades may also be a problem in terms of noise and impact on bird life.

As an alternative to multi-blade wind turbines with rotating alternators, it is known to use piezoelectric elements or materials for converting mechanical energy into electrical energy. For example, FR-2922607-A1 discloses an electrical power generator in which a kind of pole is supported on piezoelectric elements, such that when the pole is driven or moved by the wind, the movement of the pole is converted into electrical energy by the piezoelectric elements.

JP-2006-158113-A describes a mechanism for converting mechanical energy into electrical energy using a piezoelectric element attached to a magnet.

It is also known in the art to use so-called "von Karman vortices" or simply "Karman vortices" to drive a generator. For example, JP-2006-132397-A describes the use of the Karman vortices in water to cause vibration of a column that is coupled to a piezoelectric plate. Similarly, JP-2006-226221-A and EP-2602483-A1 refer to electrical generators based on Karman vortices.

For example, EP-2602483-A1 describes an electrical power generator comprising a pole configured to deliberately transform a stationary and laminar flow of air into a turbulent flow, wherein eddies or vortices appear in a synchronised manner throughout the length of the pole. Therefore, the pole sustains two forces, namely, a drag force in the same direction as the wind and a lift force produced in a direction perpendicular to the direction of the wind, the direction of which changes sign, with a frequency that corresponds to the frequency of the appearance of new vortices and which can be calculated using the following formula:

$$F_v = S*V/d,$$

where $F_v$ is the frequency of appearance of vortices, V the velocity of the air and d the characteristic dimension of the pole, for example, in the case of a pole having a circular cross-section, the diameter of the pole. S is Strouhal's dimensionless number. Given that the velocity of the air increases with height, according to the Hellmann exponential Law, to achieve synchronisation in the appearance of vortices, EP-2602483-A1 proposes an increase in pole diameter with the increase of height. EP-2602483-A1 does not explain in detail how the movement of the pole is converted into electrical energy, but reference is made to elements with high electromechanical coupling. On the other hand, EP-2602483-A1 proposes active modulation of the apparent Young's modulus or apparent elasticity modulus of the pole, by varying the electrical voltages to which the elements with high electromechanical coupling are subjected.

WO-2014/135551-A1, which is incorporated herein by reference, discloses other examples of electrical power generators based on Karman vortices, in which the oscillating movement of a pole is converted into electrical energy by piezoelectric systems. It also explains how the natural frequency of oscillation of the pole can be modified by applying a voltage to a piezoelectric material that surrounds an elastic core of the pole.

An advantage with this type of generator based on the Karman vortices is that it can operate without bearings, gears and lubricants and that it does not require additional means for starting up the generator.

Although the use of piezoelectric elements may seem to be an ideal solution to the problem of tuning the pole to variations in the speed of movement of the fluid, for example, the wind speed and also for converting an oscillatory and non-rotational movement—such as the movement naturally generated by the Karman vortices—into electricity, it has been found that it may be interesting to find technically and economically feasible alternatives to the use of substantial amounts of piezoelectric material.

US-2008/0048455-A1 describes another example of a Karman vortex driven electrical generator based on the use of a gyroscopic power generator. However, this type of mechanism involves rotating elements and thereby the kind of maintenance related problems discussed above.

WO-2012/066550-A1 describes another generator based on the use of Karman vortices, with an active control of the frequency of vortex formation to adjust it to the natural frequency of oscillation of the capture element.

US-2005/0230973-A1 discloses another vibration based power generator including a vortex shedding device. The described embodiments relate to the context of energy production in a well, taking advantage of the fluid produced from a formation. Different means for converting vibration into electric power are disclosed, including piezoelectric means and magnets interacting with coils.

JP-2012-151985-A and JP-2012-151982-A disclose vibration power generators based on magnets oscillating in relation to a coil, and including means for changing a resonance frequency.

SUMMARY

A first aspect of the disclosure relates to an electrical power generator, comprising a first part having an elongated shape, a first end, and a second end. For example, the first part can be shaped of a post, pillar, or pole. The first part is arranged for attachment to a base adjacent to the first end. Thus, the first end is directed towards or facing the base and the second end is more distanced from the base. However, the first end is not necessarily attached to the base, and in many embodiments, the first end is substantially spaced from the base.

The first part is configured to be located in a fluid, for example, in the air, although there are also other possibilities, such as water. The fluid may have a substantially stationary and laminar flow, a characteristic that is normally present in the wind. The first part is configured such that, when the fluid moves, it generates vortices in the fluid in such a way that a lift force is generated on the first part which produces an oscillating movement of the first part as described in, for example, WO-2014/135551-A1. As the first part is attached to the base in correspondence with its first end, the amplitude of the oscillation will be larger in correspondence with the second end than in correspondence with the first end. The term "base" refers to the point with respect to which oscillation takes place, that is, the point of "fixed attachment". For example, when the first part is attached to a base via a flexible element, the place of insertion of the flexible element into a fixed and/or rigid structure will be considered as the base.

The electrical power generator further comprises a subsystem for converting the oscillating movement of the first part into electrical energy. This subsystem is at least partially housed within the first part, between the first end and the second end thereof. In some embodiments, the subsystem is completely housed within the first part.

Traditionally, many so-called vortex generators have basically been based on a capturing element arranged to oscillate in relation to a base, and associated to some kind of external subsystem for converting the oscillating movement into electrical energy. WO-2014/135551-A1 discloses an example of this kind of device, wherein the first part or pole is arranged to oscillate in a cantilever manner in relation to a base, and wherein in correspondence with the base a subsystem for conversion of the movement into electrical energy is basically surrounding the first element. That is, the first part is a capturing element which can be regarded to capture energy from the wind due to the way in which the vortices trigger and maintain the oscillation of the first part, and this capturing element is then linked to an external subsystem for energy conversion. A similar approach is taken in for example WO-2012/066550-A1 and in US-2008/0048455-A1: in both cases an element arranged to oscillate in relation to some kind of base is linked to an external subsystem for conversion of mechanical energy into electrical energy.

However, it has been found that there can be many advantages involved with placing a subsystem for converting the movement of the first part into electrical energy at least partially within the capturing element. One of these advantages is that it provides for a compact arrangement of the energy conversion means. In order to maximise energy capture while minimizing material costs and weight, the first part, that is, the part that can be regarded as a capturing element, is advantageously a substantially hollow part. Arranging the subsystem for converting movement of the first part into electrical energy, at least partially within the first part, provides for a compact and elegant arrangement, for example, in the form of an elongated pole, without a potentially bulky subsystem for converting mechanical energy into electrical energy surrounding its base, as in the prior art systems known from WO-2012/066550-A1, US-2008/0048455-A1, and WO-2014/135551-A1.

Another advantage relates to the fact that when the elongated first part oscillates in relation to the base to which it is attached in correspondence with its first end, for example, via some kind of elastic element as taught in WO-2014/135551-A1, the amplitude of the oscillating movement as well as the maximum velocities of the displacement increase in the axial direction of the oscillating element, from the first end to the second end. For many energy conversion systems, for example, for a conversion system based on an interaction between magnets and coils, both amplitude and velocity can be important to provide for efficient conversion of the energy represented by the movement of the first part into electrical energy. Thus, placing for example magnets and coils away from the base can be advantageous in terms of efficient energy conversion. For example, when the conversion takes place due to relative movement between magnets and coils, a high velocity can be preferred as the electromotive force induced in a coil is proportional to the change in the magnetic field traversing the coil.

In some embodiments, the second end is at a distance H above the first end, and the subsystem is placed at a distance of more than 0.05H above the first end, preferably at a distance of more than 0.1H above the first end, even more preferably at a distance of more than 0.2H, such as at a distance of more than 0.3H or more than 0.4H, above the first end, and optionally at a distance of at least 0.1H below the second end, such as at a distance of more than 0.2H, more than 0.3H or more than 0.4H below the second end. For example, in some embodiments the subsystem is placed at a distance of more than 0.1H above the first end and more than 0.1H below the second end, such as at a distance of more than 0.2H above the first end and more than 0.2H below the second end, for example, towards the longitudinal center portion of the first part, for example, at a distance of more than 0.3H above the first end and more than 0.3H below the second end. In other embodiments, the subsystem can be positioned close to the first end (such as in the bottom 10% or 20% of the longitudinal extension of the first part), and in other embodiments it can be placed at the second end or close to it (such as in the upper 10% or 20% of the longitudinal extension of the first part).

In some embodiments, the first end is positioned above the base. In other embodiments, the first end is positioned below the base. In some embodiments, the first part is placed a distance above the base that corresponds to between 5% and 40% of the longitudinal extension of the first part, such as between 10% and 30%, that is, of the distance between the first end and the second end of the first part.

Placing the subsystem at a substantial distance from the base and preferably also at a substantial distance from the first end of the first part (such as at a distance of 0.1H, 0.2H, 0.3H or 0.4H or more from the first end) may imply a substantial amplitude and maximum velocity of the oscillating movement where the subsystem is placed, which can provide for a correspondingly substantial amplitude and velocity of the relative movement between parts of the subsystem, such as between magnets and coils, thereby enhancing performance of the subsystem in terms of efficient energy conversion. In some embodiments, it is, however, preferred that the subsystem is placed at a certain distance from the second end of the first part, as the amplitude of the movement in correspondence with the second end can make it difficult or impossible to avoid collision between, for example, the inner walls of the first part and the subsystem or the structure supporting the subsystem.

In some embodiments of the disclosure, the electrical power generator further comprising a second part extending from the base in an axial direction, and the subsystem comprises at least one first subsystem component and at least one second subsystem component arranged for the production of electrical power by movement of the first subsystem component in relation to the second subsystem component, wherein the first subsystem component is attached to the first part and the second subsystem component is attached to the second part, so that the oscillating movement of the first part produces an oscillating movement of the first subsystem component in relation to the second subsystem component. That is, part of the subsystem can for example be placed on a relatively fixed and static structure within the first part, for example, on some kind of tubular or tower structure, whereas another part of the subsystem can be fixed to the first part, whereby the oscillating movement of the first part will cause the two parts of the subsystem to move in relation to each other. This movement can be used to generate electrical power, for example, by operating an alternator.

In some embodiments, at least one of the first subsystem component and the second subsystem component comprises at least one magnet and at least another one of the first subsystem component and the second subsystem component comprises at least one coil, arranged so that the oscillating movement generates an electromotive force in the at least one coil by relative displacement between the at least one magnet and the at least one coil. The oscillating movement of the first part results in a variation in the magnetic field to which the coil or coils are exposed, whereby the oscillating movement of the first part is converted into electrical energy.

As the efficiency of power conversion is related to the velocity of change in the magnetic field passing through the coil, the relatively high velocity of the relative movement between magnet or magnet assemblies and coil or coils that is achieved due to the fact that the subsystem is placed at a substantial axial distance from the base, enhances the performance of the electrical power generator.

Any suitable configuration of magnets and coils can be used. It is sometimes preferred that the coil or coils is/are part of the second subsystem component, as this sometimes can facilitate extraction of the electrical current without any cables or similar having to be attached to the oscillating first part. That is, arranging the coils on the preferably static second part can be advantageous as the connections to an external electric system can be made without connection to the first part, which is arranged to oscillate. If the coils are in the first part, the conductors evacuating the energy may be exposed to degradation by fatigue and the viscous losses may be unnecessarily increased.

Thus, in many embodiments, the first subsystem component comprises one or more magnets, for example, arranged in a plane above and below the coil or coils, whereas the second subsystem component comprises one or more coils. The magnets can be arranged forming rings of magnets above and below the coil or coils. Thus, for example, rings of magnets can be arranged in two or more planes, and one or more for example ring-shaped coils can be provided in one or more planes between the planes determined by the rings of magnets.

In some embodiments, the at least one coil comprises at least two coils arranged in a common plane and surrounding an axis of the second part, one of the coils being external to the other one of the coils, the two coils being connected in series so that when current circulates in a clockwise direction through one of the coils, current circulates in a counter-clockwise direction through the other one of the coils, and vice-versa. For example, two coils can be arranged in a plane perpendicular to the vertical axis of the second part, and magnets such as annular magnets can be placed in two adjacent planes, so that the two coils are sandwiched between the planes with the magnets. The annular magnets can be arranged so that during oscillation, when the first part oscillates in one direction, one portion of the magnets pass above/below the external one of the coils, and the diametrically opposed part of the magnets pass above/below the internal one of the coils, so that due to the interconnection of the coils, both portions of the magnet contribute to enhancing the current flowing through the coils. In some embodiments, only one coil is present in each plane, or a plurality of individual coils are used that are not interconnected as explained above.

It can be advantageous to provide ferromagnetic material in correspondence with the magnets, for example, in correspondence with the annular magnets, including for example ferromagnetic material arranged radially outside the magnets, in order to orient the magnetic field in a desired direction. This can be especially convenient in the case when the magnets are intended to interact with individual coils. Additionally or alternatively, ferromagnetic material can also be arranged in correspondence with the coils, such as between the coils (for example, between interconnected coils) and/or radially outside and/or inside the coils.

In some embodiments of the disclosure, the subsystem comprises at least one annular magnet or at least one annular coil arranged in a plane perpendicular to a longitudinal axis of the first part, wherein said annular magnet or annular coil is asymmetrically positioned in relation to the longitudinal axis. The reason for this is that it has been found that sometimes, at least in some embodiments, the oscillating movement of the first part may not be in one single vertical plane, but it can actually acquire a circular or curved component, especially if tuning magnets are present (such tuning magnets will be discussed below). If such a circular or curved component is present, having at least one coil displaced so that its center point is substantially spaced from the longitudinal axis of the system and of the first part (here, reference is made to the longitudinal axis of the first part when the first part is at rest, that is, not oscillating), can enhance the energy production, as it enhances the relative movement between the asymmetrically placed coil and symmetrically placed rings of magnets, or vice-versa. For example, several asymmetrically placed coils can be arranged in several planes one above the other, and the displacement of their center points in relation to the longitudinal axis can be in different radial directions from the longitudinal axis. For example, in one possible embodiment, three asymmetrically placed coils are placed in three different planes, one above the other, and their center points are displaced form the longitudinal axis in three different directions angularly spaced by for example 120 degrees in relation to each other. When asymmetrically placed coils are used, the annular magnets can be placed symmetrically in relation to the longitudinal axis (that is, so that the longitudinal axis passes through the centers of the annular magnets), and vice-versa. This solution is applicable not only in the cases in which the plane (or planes) with a coil includes one or more individual coils, but also in for example cases in which one or more planes each include two coils connected in series as explained above.

In some embodiments of the disclosure, the magnets are arranged such that when the first part moves during the oscillatory movement from a neutral position to an extreme tilted position, said at least one coil is subjected to at least one change of polarity or direction of magnetic field, preferably to a plurality of changes of direction of the magnetic field.

In some embodiments of the disclosure, there are several subsets of magnets arranged in different planes at different heights above the base, for example, as several rings arranged one above the other, and with coils arranged in planes between the planes with the magnets.

A second aspect of the disclosure relates to an electrical power generator comprising a first part, for example in the shape of a post, pillar or pole, configured to be located in a fluid, for example, in the air, although there are also other possibilities, such as water. The fluid may have a substantially stationary and laminar flow, which is often the case with the wind. The first part is configured such that, when the fluid moves, the first part generates vortices in the fluid in such a way that a lift force is generated on the first part which produces an oscillating movement of the first part as described in, for example, WO-2014/135551-A1. The oscillating movement has an amplitude related, in a certain manner, to the wind speed.

In addition, the generator has a second part arranged at least partially within the first part. The first part can be anchored to the base, for example, directly or via another element such as a rod or similar, such that the first part can perform an oscillating or swaying or swinging movement in relation to the anchoring point or base. The second part is at least partially arranged within the first part, such as in a hollow space delimited by inner walls of the first part. Due to the oscillating movement of the first part with respect to the base, the inner walls of the first part will be approaching one side and then the other side of the second part. The inner surface of the first part surrounding at least part of the second part therefore approaches the second part once for every half cycle of oscillation.

According to this aspect of the disclosure, the generator comprises means for generating a magnetic field which produces a magnetic repulsion force between the first part and the second part, a repulsive force that varies with the oscillating movement of the first part and which has a maximum value (that is, a maximum value which occurs once in each half cycle of the oscillating movement, when the first part—or, rather, the inner surface of the first part reaches the position where it is closest to the second part). When the amplitude of the oscillating movement of the first part increases, this position gets closer and closer to the second part, and thus the maximum level of the repulsive force increases accordingly.

Therefore, the magnetic repulsion force between the first part and the second part increases when the amplitude of the oscillating movement increases and decreases when the amplitude of the oscillating movement decreases. It has been observed that when the wind speed increases, the amplitude of the oscillating movement of the first part also increases and the maximum value of the repulsion force also increases. As wind speed continues to increase, although the amplitude grows at a declining rate, the repulsion force on the contrary increases very quickly—since this increase is preferably inversely proportional to the square of a distance between the relevant portions of the first part and the second part—allowing the system to store potential energy in the magnets which is completely or substantially converted to kinetic energy (velocity) as the first part passes through the neutral position of zero bending. This provides for an increase in the natural oscillation frequency of the first part. In other words, the repulsion force modifies the behaviour of the first part as if the Young's modulus or elasticity modulus of the first part were variable. Therefore, when the wind speed increases, the natural oscillation frequency of the first part also increases automatically, and vice-versa. Thus, a passive adaptation or passive control of the resonance frequency of the first part as a function of wind speed is achieved, which can serve as an alternative or complement to active adaptation, such as the one based on the application of a voltage to a piezoelectric material described in WO-2014/135551-A1.

For example, in the case of a pole-shaped first part that does not have a system for adapting the resonance frequency, when the wind speed is too low the pole does not oscillate. As wind speed increases and approaches the speed at which the frequency of appearance of vortices coincides with the natural oscillation frequency of the structure, the amplitude of the oscillation of the pole increases, until reaching a maximum. If the wind speed continues to increase, the amplitude begins to decrease, since the vortices start to be generated too quickly, whilst the natural oscillation frequency of the structure remains constant. Finally, if the wind speed continues to increase even further, the pole stops oscillating. The narrow wind speed ranges from the speed at which the pole starts oscillating to the speed at which the pole stops oscillating is called the "lock-in" range. One effect of the disclosure is that, owing to the adaptation of the natural oscillation frequency of the system, the lock-in range can be widened.

Although this kind of adaptation of the natural oscillation frequency of the system could also be achieved with a second part arranged outside the first part, for example, surrounding the first part completely or partially (such as described in the co-pending application no. PCT/EP2015/072802), arranging the second part within the first part involves certain advantages. For example, a very compact arrangement can be obtained, with outer dimensions substantially corresponding to the dimensions of the first part, especially in terms of the maximum radial extension of the generator. An efficient use of space is obtained, for example, use is made of the empty space within the first part. The dimensions of the first part are at least in part determined by the need to interact with the air and the need to synchronise a production of vortices along the first part. Thus, for a given desired height of the first part, the diameter of the first part will preferably be within a certain range (and generally vary in the axial direction of the first part). In prior art arrangements such as those described in WO-2014/135551-A1, the space within the first part—the first part can often be chosen to be hollow to minimize the use of material and/or weight is wasted.

Taking advantage of this space for incorporating a system for passive tuning of the natural frequency of oscillation of the first part is therefore an advantage, not only from a logistic point of view: it also makes it possible to produce this kind of generators with an attractive design, and without any need (or with a reduced need) for an external structure supporting magnets, for example, radially outside the first part or below the first part, radially spaced from for example a rod supporting the first part.

On the other hand, providing for the repulsion between the first part and the second part within the first part makes it possible to provide for the repulsion at a substantial distance from the base, which can be advantageous for the purpose of making efficient use of magnetic material, taking advantage of the "lever effect". That is, it provides for an efficient use of the magnetic material needed to produce the tuning of the natural frequency of oscillation of the first part to the wind speed. A given repulsion force provided by the magnets has a larger impact on the natural frequency of oscillation if it is applied at a position where the angular momentum of the first part is relatively small. Therefore, it is advantageous to provide the magnets in charge of producing this repulsion at a relatively large distance from the point where the first part is anchored, that is, at a relatively large distance from the base.

In some embodiments of the disclosure, the means for generating a magnetic field comprise at least one first magnet (for example, one or more annular magnets, or a plurality of magnets which are arranged at two or more points, preferably diametrically opposed, on the first part, for example, forming continuous or discontinuous rings at one or more heights within the first part) associated to (for example, attached to) the first part and at least one second magnet (for example, one or more annular magnets, or a plurality of magnets which are arranged in correspondence with two or more points, preferably diametrically opposed, of the second part, for example, forming continuous or discontinuous rings, at one or more heights of the second part) associated to (for example, attached to) the second part. Said at least one first magnet and said at least one second magnet are arranged in such a way that they repel each other and in such a way that when the oscillating movement of the first part takes place, the distance between said at least one first magnet and said at least one second magnet varies in accordance with said oscillating movement. As the repulsion force between the two magnets is inversely proportional to the square of the distance between the magnets, the force will vary substantially during the oscillation of the first part and its maximum value may depend significantly on the amplitude of the oscillating movement. Thus, a variation in the amplitude of oscillation of the first part will correspond to a variation in the maximum repulsive force and, therefore, to a variation of the natural oscillation frequency of the first part.

In some embodiments of the disclosure, the at least one first magnet comprises at least two diametrically opposed parts and the at least one second magnet comprises at least two diametrically opposite parts, facing the at least two diametrically opposed parts of the at least one first magnet. In this way, when the swaying or oscillating movement of the first part takes place, the first and second magnets approach each other on one side of the second part while moving away from the diametrically opposite side, and an oscillating force is produced on the first part, the sign and amplitude of which vary periodically, depending on the distances between the magnets.

In some embodiments of the disclosure, the at least one first magnet is configured as at least one ring, for example, as several rings at different heights, and/or the at least one second magnet is configured as at least one ring, for example, as several rings at different heights. These rings can be formed of juxtaposed individual magnets. The use of magnets in the shape of a ring, for example, horizontal rings, may be useful for the generator to work in the same way regardless of wind direction. However, for example, in places where the wind blows (or other fluid flows) in only a limited range of directions, it may be enough to have pairs of first and second magnets arranged in the predictable vertical planes of oscillation of the first part.

In some embodiments of the disclosure, the at least one first magnet comprises a plurality of first magnets arranged at different heights above a base of the generator and the at least one second magnet comprises a plurality of second magnets arranged at different heights above a base of the generator.

By choosing the size and strength of the magnets, the number of magnets and the number of rows of magnets in the vertical direction, as well as the position of the magnets, an interaction between the magnets associated to the first part and the magnets associated to the second part can be set, which serves for the natural frequency of the first part to vary in the most aligned manner possible with the frequency of appearance of the vortices, which in turn varies according to the relative velocity between the fluid (for example, air) and the first part.

In some embodiments, the at least one first magnet comprises a first plurality of magnets arranged substantially adjacent to each other, for example, above each other or side by side in the horizontal plane, and with polarities arranged (for example, in accordance with the Halbach array) so that the magnetic field produced by the first plurality of magnets is stronger on a side of said magnets facing the at least one second magnet than on an opposite side, and/or the at least one second magnet comprises a second plurality of magnets arranged substantially adjacent to each other, for example, above each other or side by side, and with polarities arranged (for example, in accordance with the Halbach array) so that the magnetic field produced by the second plurality of magnets is stronger on a side facing the at least one first magnet than on an opposite side. This arrangement serves to enhance the efficiency of the magnets in terms of their contribution to the increase of the resonance frequency of the first part when the speed of the fluid increases, and vice-versa. That is, basically, when arranging the magnets in this manner, for example, following the Halbach array layout, that is, arranging the magnets in this way known to augment the magnetic field on one side of the array while cancelling the field to near zero on the other side, the magnetic field will be strongest on the side where the first and second magnets face each other, and thereby provide for an efficient use of the magnets.

In some embodiments, the at least one first magnet and the at least one second magnet are arranged in an inclined manner in relation to a longitudinal axis, such as a vertical axis, of the first part. In some embodiments, the inclination is such that the distance between the magnets and an axis of symmetry or a longitudinal axis of the first part increases as a function of the height above a bottom end of the first part or the base. For example, the first and second magnets can be arranged as rings of magnets having a truncated cone shape or at least one surface shaped as a truncated cone. This inclination has been found to be useful to introduce a torque that can serve to reduce or eliminate a tendency of the first part to enter resonant modes different from the one corresponding to its natural frequency of oscillation.

In some embodiments or aspects, the first part is arranged so that the amplitude of the oscillating movement increases with the velocity of the fluid, for example, with increasing wind speed, at least within or for a certain range of velocities.

As explained above, the principle of operation can in some embodiments of the disclosure be as follows: the repulsion force between the first magnet or magnets and the second magnet or magnets is inversely proportional to the square of the distance between the first magnet/magnets and the second magnet/magnets; when the speed of the fluid (such as the wind speed) increases, the amplitude of the oscillating movement tends to increase, whereby the magnets tend to get closer during a part of maximum approach of each oscillation cycle, whereby the maximum repulsion force produced between the first magnet(s) and the second magnet(s) in each oscillation cycle increases accordingly.

The increase of the repulsion force increases the resonance frequency of the first part, whereby the structure of the generator contributes to an automatic increase in the resonance frequency of the first part when the speed of the fluid increases, and vice-versa.

In some embodiments, the second end is at a distance H above the first end, and the means for generating a magnetic field are placed at a distance of more than 0.05H above the first end, preferably at a distance of more than 0.1H above the first end, even more preferably at a distance of more than 0.2H, such as at a distance of more than 0.3H or more than 0.4H above the first end, and optionally at a distance of at least 0.1H below the second end, such as at a distance of more than 0.2H, more than 0.3H or more than 0.4H below the second end.

Placing the means for generating the repulsive magnetic field at a substantial height above the base can be advantageous in that it may help to reduce the amount of magnetic material, such as neodymium alloy, needed to achieve the necessary adaptation or tuning of the natural frequency of oscillation. This is believed to be due, at least in part, to the lever effect. As explained above, a given repulsion force will have a larger impact on the natural frequency of oscillation if it is applied at a point where the angular momentum is small. The angular momentum of a pole oscillating in a swaying manner in relation to a base to which one end of the pole is anchored decreases with the distance to the base, that is, it is smaller far away from the base than close to the base.

A further aspect of the disclosure corresponds to a generator according to both of the aspects described above. Here, for example, one or more magnets forming part of the means for generating a magnetic field which produces a magnetic repulsion force between the first part and the second part may also form part of the subsystem for converting the oscillating movement of the first part into electrical energy. Thereby, efficient use is made of the magnetic material, which serves to further reduce the cost of the generator.

A further aspect of the disclosure relates to an electrical power generator, comprising an elongated first part having a first end and a second end, for example in the shape of a post, pillar or pole, configured to be located in a fluid, for example, in the air, although there are also other possibilities, such as water. The fluid may have a substantially stationary and laminar flow, a characteristic that is normally present in the wind. The first part is configured such that, when the fluid moves, the first part generates vortices in the fluid in such a way that a lift force is generated on the first part which produces an oscillating movement of the first part as described in, for example, WO-2014/135551-A1. The generator further comprises a subsystem for converting the oscillating movement of the first part into electrical energy. In this aspect of the disclosure, the first part has a substantially circular cross section with a diameter that increases from the first end towards the second end along at least 70%, preferably at least 80%, more preferably at least 90%, of the height of the first part from the first end towards the second end. From a position closer to the second end than to the first end, the diameter of the first part starts to decrease in the direction from the first end towards the second end, and the longitudinal cross section of the first part features, at said position, a convex portion towards the exterior, followed by a concave portion between the convex portion and the second end.

It has been found that this reduction in diameter, including the configuration with a convex portion followed by a concave portion, helps to avoid or minimize the appearance of vortices at the upper end of the first element that distort the desired vortices, that is, the vortices that contribute to the oscillatory movement. Thus, this shape of the upper end of the first part contributes to enhancing the efficiency with which the first part captures energy from the wind.

In some embodiments the disclosure is in accordance with two or more of the aspects described above.

Another aspect of the disclosure relates to a method for making an electrical power generator tune with wind speed. The method is applicable to an electrical power generator comprising a first part, for example, in the shape of a post, pillar or pole, configured to be located in a fluid, for example, in the air, although there are also other possibilities, such as water. The fluid may have a substantially stationary and laminar flow, which is normally the case with the wind. The first part is configured such that, when the fluid moves, the first part generates vortices in the fluid in such a way that a lift force is generated on the first part which produces an oscillating movement of the first part as described in, for example, EP-2602483-A1 or WO-2014/135551-A1. The generator also comprises a second part extending at least partially within the first part, for example, in parallel with a longitudinal axis of the first part, until a certain height.

The method comprises the step of placing at least one first magnet on the first part and at least one second magnet on the second part, such that the at least one first magnet and the at least one second magnet repel each other. The effect achieved with this arrangement has been explained above. It helps to automatically adapt the natural oscillation frequency of the first part to the frequency of appearance of vortices.

Another aspect of the disclosure relates to the use of a plurality of magnets in an electrical power generator comprising a first part, for example, in the shape of a post, pillar or pole, configured to be located in a fluid, for example, in the air, although there are also other possibilities, such as water. The fluid may have a substantially stationary and laminar flow, which is often the case with the wind. The first part is configured such that, when the fluid moves, the first part generates vortices in the fluid in such a way that a lift force is generated on the first part which produces an oscillating movement of the first part, as described in, for example, EP-2602483-A1 or WO-2014/135551-A1. The generator also comprises a second part extending at least partially within the first part, for example, in parallel with a longitudinal axis of the first part, until a certain height. The use of the magnets is intended to generate an automatic adaptation of the natural oscillation frequency of the first part to the wind speed.

In some embodiments of the disclosure, the longitudinal axis of the first part is arranged to extend generally vertically when the first part is not oscillating.

Some embodiments of the disclosure incorporate both the first aspect and the second aspect described above. In some of these embodiments of the disclosure, some or all the magnets that are part of the subsystem for converting the oscillating movement of the first part into electrical energy by inducing electrical current in the coils can also serve for at least part of the tuning of the natural oscillation frequency of the first part to wind speed. For example, at least some of the first magnets can be part of the subsystem used to induce current in the coils, which is why these magnets may have a dual function, thereby making efficient use of magnetic material.

In some embodiments of the disclosure, the first part may comprise an oscillating pole, configured to be able to oscillate under the influence of the Karman vortices and the second part may comprise a static structure located substantially within the pole, for example, extending upwards from the base. In some embodiments of the disclosure, the first part will have a height of at least 1 meter, for example, more than 2, 5, 10, 15, 60, 100, or 200 meters. In other embodiments of the disclosure, the pole may be smaller, for example, it may have a height lower than 1 m, for example, lower than 10 cm, lower than 1 cm, or even smaller. It has been found that even very small equipment can work properly, since they are able to adapt quickly to the changes in the wind (turbulence) given their rapid oscillation frequency.

In some embodiments, the first part has a substantially elongated shape, for example, with a circular cross section. The first part extends between a first end and a second end, and the first part is intended to be attached to a base in correspondence with its first end, for performing an oscillating movement in relation to said base. The width or the diameter of the first part generally increases with the distance from the first end, along at least a major portion of the extension of the first part between the first end and the second end, for example, along at least 50%, 60%, 70%, 80%, 90% or more of this distance. The reasons for this are explained, at least in part, in the co-pending international application PCT/EP2015/072802, the contents of which are incorporated herein by reference (cf. for example the discussion in relation to FIGS. 13A-15 of PCT/EP2015/072802). The purpose of this increase in diameter is to make sure that the vortices are produced synchronously all along the first part. The need to increase the diameter to achieve this synchronization can sometimes be due to the fact that wind speed often increases with height, as explained in EP-2602483-A1. However, this is not the only reason: one more and often maybe even more important reason, especially in the case of relatively short first parts, is the fact that the velocity of the oscillatory movement of the first part increases with the distance from the base, as explained in the co-pending international application PCT/EP2015/072802. As explained therein, EP-2602483-A1 (reference was made to the international publication WO-2012/017106-A1) did not taken into account the variation of the relative velocity of the air against the pole that is due to the very movement of the pole. As explained in the co-pending international application PCT/EP2015/072802, the geometry of the first part should be carefully designed such that the generated vortices act synchronously throughout its length, so as to prevent the effect of the vortices generated at certain height from being fully or partially cancelled by those generated at a different height. In order for the geometry of the pole to have a proper or optimal performance it is not only necessary to consider the air speed profile in the working area of the device, but it is also necessary to take into account the oscillation of the pole itself, given that the oscillation of the pole affects the relative velocity between air and pole at different heights.

However, in spite of the increase in diameter, the first part can be kept relatively slim. It has been found that good synchronization of the vortices along the pole can be achieved while keeping the maximum diameter of the first part within 25%, 20%, 15% or less of the distance between the first end of the first part and the second end of the first part. However, in many embodiments the maximum diameter of the first part is at least 5% of the distance between the first end of the first part and the second end of the first part, often substantially more.

However, as explained above, when approaching the second end in the direction from the first end, in some embodiments the diameter can start to decrease, for example, in correspondence with a convex portion of the longitudinal cross section of the first part, optionally followed by a concave portion prior to reaching the second end.

In many embodiments of the disclosure, the first part is attached to the base via an attachment element, such as a rod or bar or similar, arranged to allow for the oscillatory movement of the first part, for example, by elastic deformation, due to the way in which it is connected to the base, or in any other suitable way. The attachment element may extend into the first part, the second part may extend into the first part, and the second part may surround the attachment element at least partially inside the first part. For example, the attachment element can comprise a pole or bar or rod or similar, such as an elastic rod, which is attached to the first part and to the base. The second part can, for example, comprise a cylindrical portion and/or a plurality of vertical bars, rods or legs that extend in parallel with the attachment element, for example, with the attachment element arranged in the center of the cylindrical part or in the center of these bars, rods or legs.

In some embodiments of the disclosure, the first part is attached to the base via a rod member or similar, for example, via an elastic rod member, extending from the base and into the first part, for example, until a distance from the first end of more than 5%, 10%, 20%, 30%, 40%, 50% or more of the distance between the first end and the second end. On the other hand, in some of these embodiments the second part extends into the first part until an axial position beyond the rod member.

From a constructional point of view, it could be easier to attach the rod member to the first part axially beyond the termination of the second part, especially when the second part is radially outside the rod member, for example, surrounding the rod member. However, the space occupied by the rod member and the space needed for its movement during oscillation of the first part can make it difficult to install the subsystem for converting the oscillating movement into electrical energy, and/or to install a system for tuning the natural frequency of oscillation of the first part using a repulsive magnetic force as explained above, at an axial position coinciding with the rod member, that is, at an axial position where the rod member is present. Thus, it can be preferred to have the second part extend beyond the rod member, including beyond the axial positions where the rod member is attached to the first part.

In some embodiments, the first part is attached to the attachment element such as to a rod member by means of arms or rods or similar, or by means of, for example, one or more plates or similar, such as for example disc-shaped members featuring one central opening for the attachment element and further openings through which axially extending portions of the second part can pass, said openings being large enough to allow for the oscillating movement of the first part and the attachment element/rod member without interference between the edges of the openings and the axially extending portions of the second part.

The first part is, in many embodiments, relatively rigid and does not deform during the oscillating movement. Thus, the first part can be designed and arranged so that the lift force acts on the first part, and the attachment element can in some embodiments be more flexible and/or more elastic than the first part and be arranged to connect the first part to the base, so that when the lift force acts on the first part, the first part will sway with regard to said base, for example, due to elastic deformation of the attachment element. This arrangement can provide for a reduction of costs as a less costly material and/or design can be used for the first part than for the attachment element, and the attachment element can be designed to make sure that the displacement or swaying of the first part will be enough to produce electrical power via the subsystem, while being resistant enough to withstand the forces generated by the wind and by the swaying of the first part, for a long time including periods with high wind speeds. Regarding the first part, what is primarily important is often its shape and size, in combination with a sufficiently low weight and sufficient resistance to wear, including weather-induced wear. Thus, using two parts with different characteristics in what regards, for example, elasticity and/or flexibility, can be an advantage and helpful to reduce costs. The attachment element may be made of a different material or of different materials than the first part, or if made of the same materials, it may comprise them in proportions different from the proportions used for the first part. The first part is preferably made of a lightweight material and can be substantially hollow. The term "attachment element" should not be interpreted in a restrictive sense and should especially not be interpreted as necessarily referring to one single element; the elastic element can for example comprise several elements arranged in any suitable manner in relation to each other. The term "elastic" refers to the elastic character of the element in the sense that after deformation by bending it tends to return to its original shape. The term "elastic" is not intended to imply any need for elastic character in terms of its performance after elongation.

For example, the first part can preferably be made of, or at least comprise, lightweight materials such as, for example, carbon fibre, fibreglass, polyester resin, epoxy resin, basalt fibres, balsa wood, aluminium and/or titanium, etc. This first part may include internal reinforcing elements such as ribs, brackets or beams that provide structural rigidity. The attachment part, such as a rod, can be made of any material suitable for providing an appropriate performance. Carbon fiber or metals such as titanium and steel are examples of suitable materials.

A generator according to the disclosure can, for example, be used to provide energy both in rural and in urban areas, for example, instead of or as a complement to solar power. For example, where a solar power installation exists, one or more generators according to the disclosure can be installed as a complement, for example, so that power can be produced also when there is not enough sunlight, for example, at night or during so-called bad weather. Here, use can be made of the circuitry already installed for adapting and conducting the electrical power obtained by the solar cells: this circuitry can be used and/or adapted to also conduct the energy coming from the generators according to the disclosure. As these generators can be provided with a slim and attractive design, and with many of their components within the slim and elegant pole used for capturing the energy from the wind, installing this kind of generators on buildings or other places may appeal to people.

In spite of the automatic tuning used in some of the embodiments described above, sometimes and maybe especially in the case of rapid changes in wind speed, the automatic tuning provided by the magnets may not be enough. Another way of tuning, or a complementary tuning, can be based on controlled injection or extraction of energy into/out of the subsystem(s) for converting movement into electrical energy.

BRIEF DESCRIPTION OF THE DRAWINGS

To complement the description and to better understand the features of the disclosure, in accordance with examples of practical embodiments of the same, a set of drawings is provided as an integral part of the description, which by way of illustration and without limitation represent the following.

DETAILED DESCRIPTION OF THE DRAWINGS

Figures 1A, 1B:
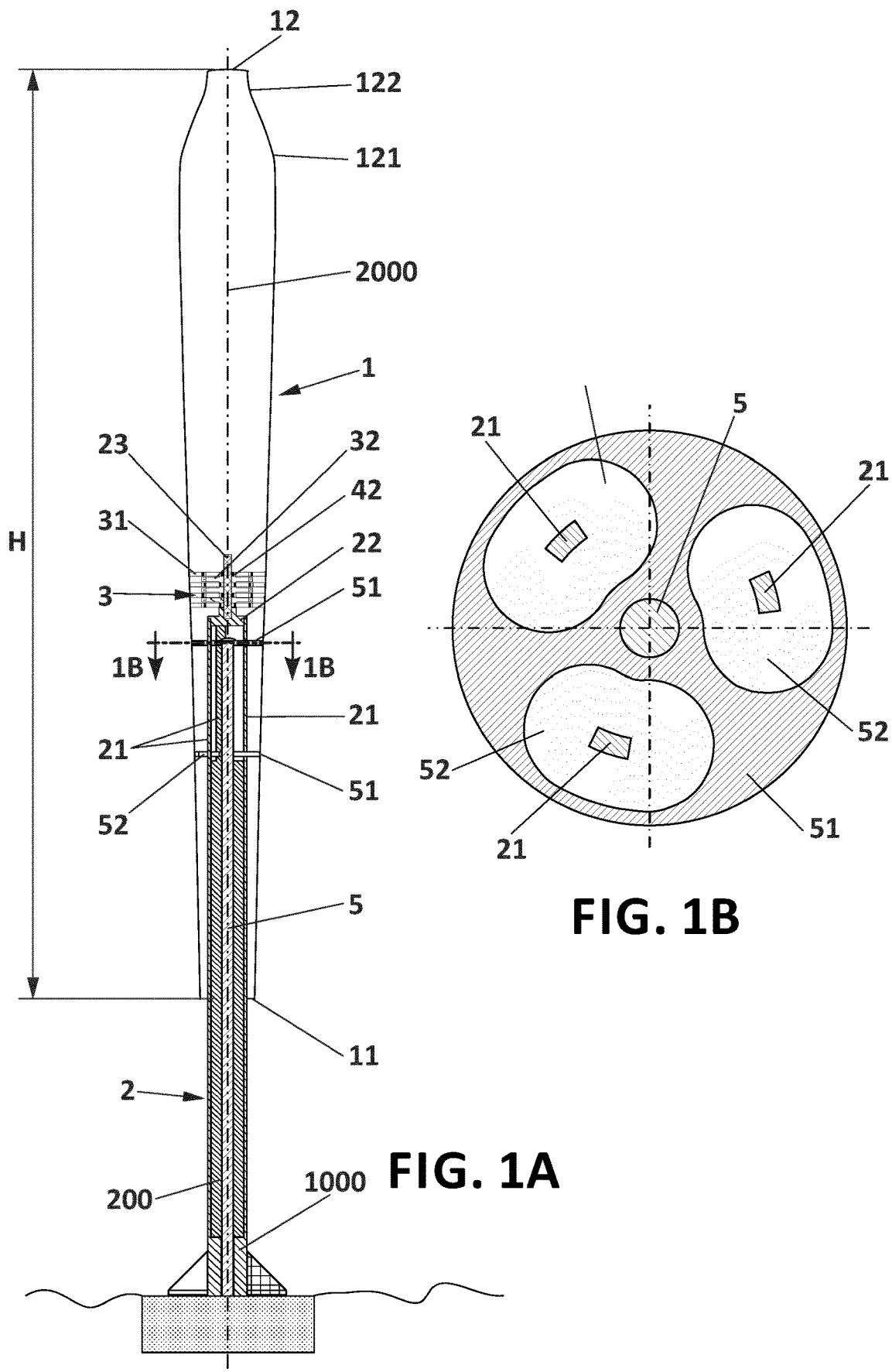
FIG. 1A is a schematic elevational view showing some of the components of a generator in accordance with a possible embodiment of the disclosure, in accordance with a longitudinal cross section of the generator.
FIG. 1B is a schematic cross-sectional view of the generator of FIG. 1A.

FIG. 1 shows, schematically, a generator according to one possible embodiment of the disclosure. The generator comprises a first part 1 in the shape of vertically arranged pole (that is, a pole having a longitudinal axis 2000 arranged vertically) with a first end 11 (the bottom end of the first part when arranged as shown in FIG. 1A) and a second end 12 (the top end of the first part when arranged as shown in FIG. 1A). The first part has a circular cross section, which is often advantageous in that it allows the generator to operate in the same way independently of the direction of the wind. The first part 1 is attached to a base 1000 in correspondence with its first end 11, that is, with the first end directed towards the base. More specifically, the first part 1 is attached to the base 1000 via an elastic rod 5 that is inserted into the base. The term "elastic" does not exclude the possibility of using a relatively rigid rod, but merely implies that the rod should have enough capability of bending/inclining sideways to allow for an oscillating movement of the first part 1 in relation to the base, that is, an oscillating movement according to which the first part is inclined first to one side and then to the other, etc. The base comprises in this embodiment a bottom portion of a second part 2, which can be anchored to the ground or to a building or to any other suitable support in any suitable way.

Figure 2:
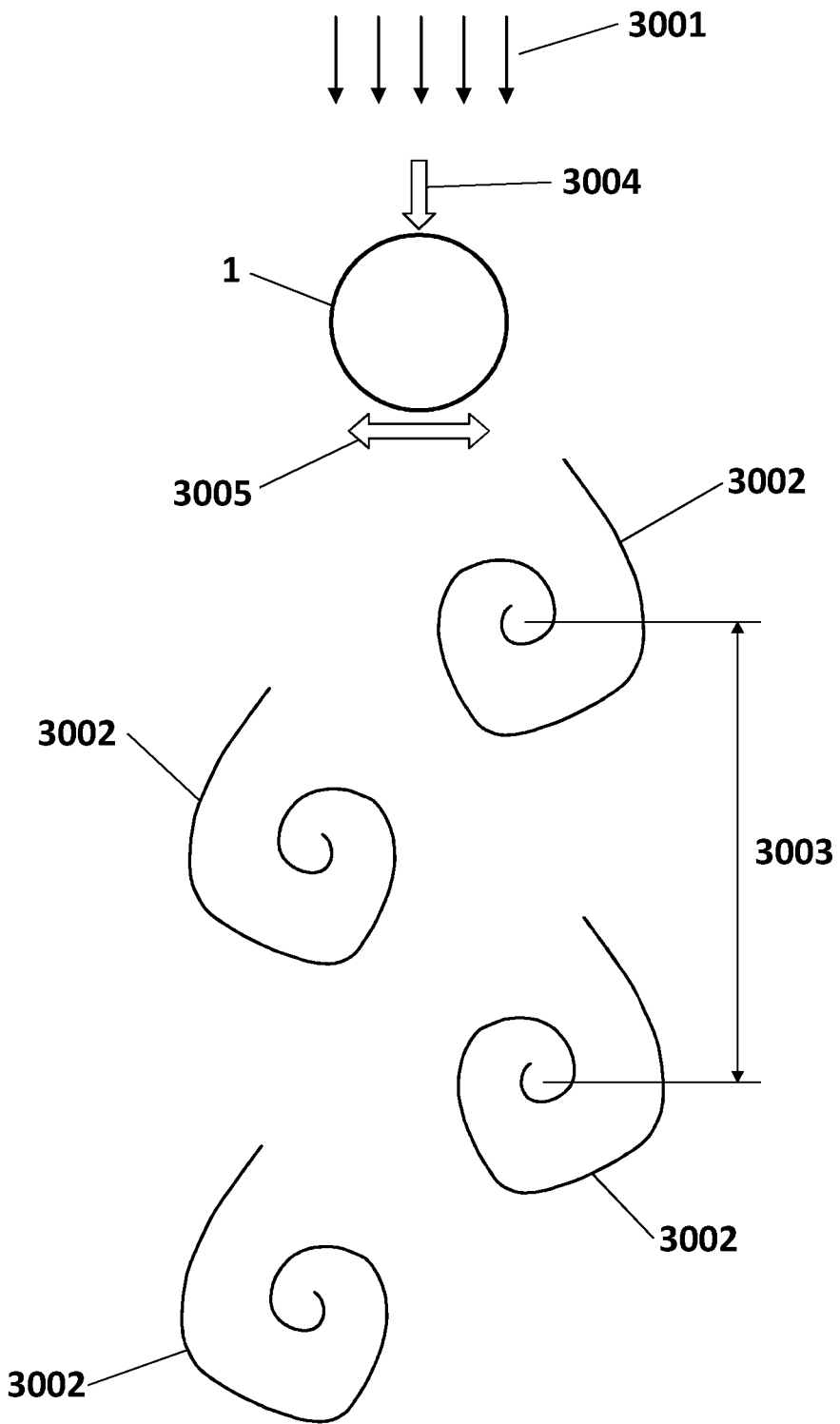
FIG. 2 is a schematic cross-sectional view of the oscillating pole of the generator according to this preferred embodiment and of the vortices generated in the fluid surrounding it.

As shown in FIG. 2, when the laminar flow 3001 of the wind strikes on the elongated pole-shaped first part 1, it produces a series of vortices 3002 that occur alternately on one side and on the other side of the pole 1 and with a constant distance 3003 between the successive vortices on each side of the pole. Therefore, a substantially constant drag force 3004 in the direction of the wind and a lift force 3005 substantially perpendicular to the general direction of the wind and to the direction of the drag force are produced on the pole 1. This lift force 3005 switches sign periodically, with a frequency that corresponds to the onset of the vortices, and this force causes the oscillation of the pole 1, towards one side and towards the other side. In this embodiment of the disclosure, the pole 1 has a circular cross section, such that its performance in what regards the capturing of energy from the wind does not depend on the direction of the wind, which can vary over time. In other embodiments of the disclosure, for example, when there is one very predominant direction of movement of the fluid, the pole may have another type of cross section, but the circular cross section can often be the most appropriate one.

The frequency of appearance of vortices depends on wind speed. In order to maximise the energy capture of the pole, it may be desirable for the vortices to appear in a synchronised manner along the pole 1. Given that the wind speed, according to the Hellmann exponential Law, increases with height and given that the frequency of the appearance of vortices depends on both the relative velocity between air and pole (which in turn depends on wind speed) and on the characteristic dimension of the pole (in this case, on the diameter of the pole), it is often appropriate for the diameter of the pole to increase with height as the relative velocity between air and pole increases with height. However, this is not the only reason for using a pole with a diameter that increase with height: as explained above, one more reason for an increasing diameter of the first part in the axial direction towards the second end is the fact that the velocity of the oscillatory movement of the first part increases with the distance from the base, as explained in the co-pending international application PCT/EP2015/072802. As explained above, in order for the geometry of the pole to have a proper or optimal performance it is not only necessary to consider the air velocity profile in the working area of the device, but it is also necessary to take into account the oscillation of the first part itself, given that the oscillation of the first part affects the relative velocity between the first part and the surrounding air. This is a reason for why the first part 1 generally features a diameter that increases with the distance from the base. However, as explained above, it has been found that an abrupt termination of the first part at the top end thereof may generate additional vortices that disturb the vortices that cause the oscillatory movement. It has been found that it is advantageous to provide a top portion of the first part where the diameter decreases towards the second end. More specifically, as schematically illustrated in FIG. 1A, after reaching its maximum diameter the longitudinal cross section of the first part features a convex portion 121 where the diameter starts to decrease towards the second end, followed (in the direction towards the second end) by a concave portion 122. This has been found to improve the efficiency of the generator in terms of its capacity of capturing energy from the wind.

The generator further comprises a second part 2, in this case, a generally cylindrical structure extending coaxially with the longitudinal axis 2000 of the first part 1, until reaching a position above the end of the rod 5. A bottom portion of the second part 2 constitutes, in this embodiment, the base 1000 in which the rod member 5 is anchored, and from there the second part comprises a first section extending upwards surrounding the rod member, defining a space 200 within which the rod member can oscillate laterally. Towards the top, the generally cylindrical body of the second part 2 terminates in three separate axially extending legs or sections 21 that extend axially further into the first part. There, the second part terminates in a platform 22 provided with an axially projecting member 23 arranged for supporting a subsystem 3 for converting the oscillating movement of the first part 1 into electrical power. This subsystem comprises a first subsystem component 31 with magnets arranged so that during the oscillatory movement the magnets are displaced in relation to a second subsystem component 32 comprising one or more coils. In this embodiment, additional magnets 42 are provided for the purpose of tuning the natural frequency of oscillation of the first part, as explained above. Also, these magnets 42 are placed on the axially projecting member 23. It may be preferred to use a material of low magnetic permeability for the axially projecting member 23 to prevent, at least to a certain extent, the magnetic field of the magnets 42 to be directed through this projecting member, which could result in a loss of efficiency of the magnets in terms of their contribution to the tuning of the natural frequency of oscillation of the first part 1.

The first part 1 is attached to the rod 5 by means of two substantially disc-shaped members 51, which are arranged to attach the first part 1 to the rod 5, as schematically shown in FIGS. 1A and 1B. The disc-shaped member 51 is fixed to the rod 5 that passes through a center opening in the disc-shaped member 51. The disc-shaped member further comprises three larger openings 52 radially spaced from the center of the disc-shaped member. As shown in FIGS. 1A and 1B, the legs or axial extensions 21 of the second part extend through these openings 52, which are large enough to allow the disc-shaped member to oscillate with the rod 5 without interfering with the legs 21. In this way, the second part 2 ends above the axial end of the rod 5, so that the equipment or subsystem 3 for converting the oscillatory movement of the first part into electrical power and also the equipment for tuning the natural frequency of oscillation can be placed above the rod 5, that is, without any risk of interfering with it during oscillation.

Figure 3A:
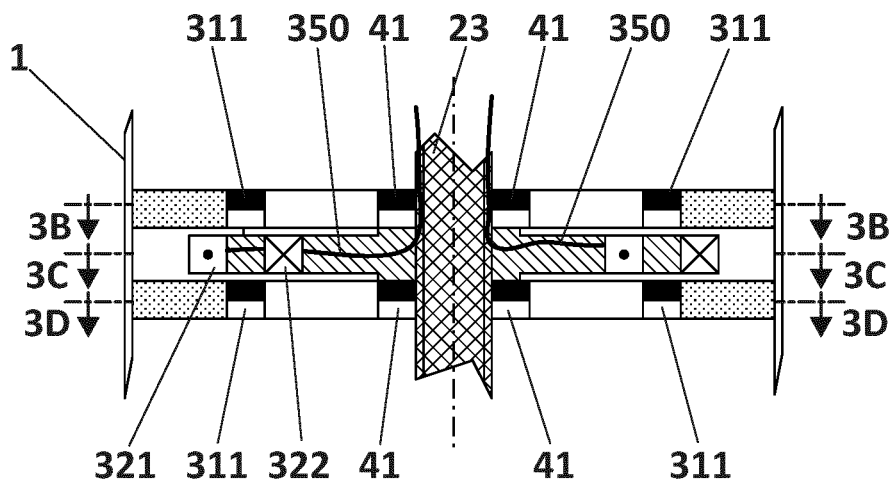
FIGS. 3A-3D are a schematic cross-sectional view (FIG. 3A) and schematic top views (FIGS. 3C-3D) of a portion of a subsystem for converting oscillating movement into electrical power in accordance with one embodiment of the disclosure.

FIG. 3A schematically illustrates a portion of a subsystem for converting the movement of the first part 1 into electrical power. The subsystem comprises two coils 321 and 322 interconnected so that when current flows in one direction (such as clockwise) in one of the coils, it flows in the opposite direction in the other coil. The coils are attached to the second part 2 and, more specifically, to the projecting member 23 discussed in relation to FIG. 1. Electrical conducting wires 350 are arranged for conducting the generated current away from the coils, along the second part.

Figure 3B:
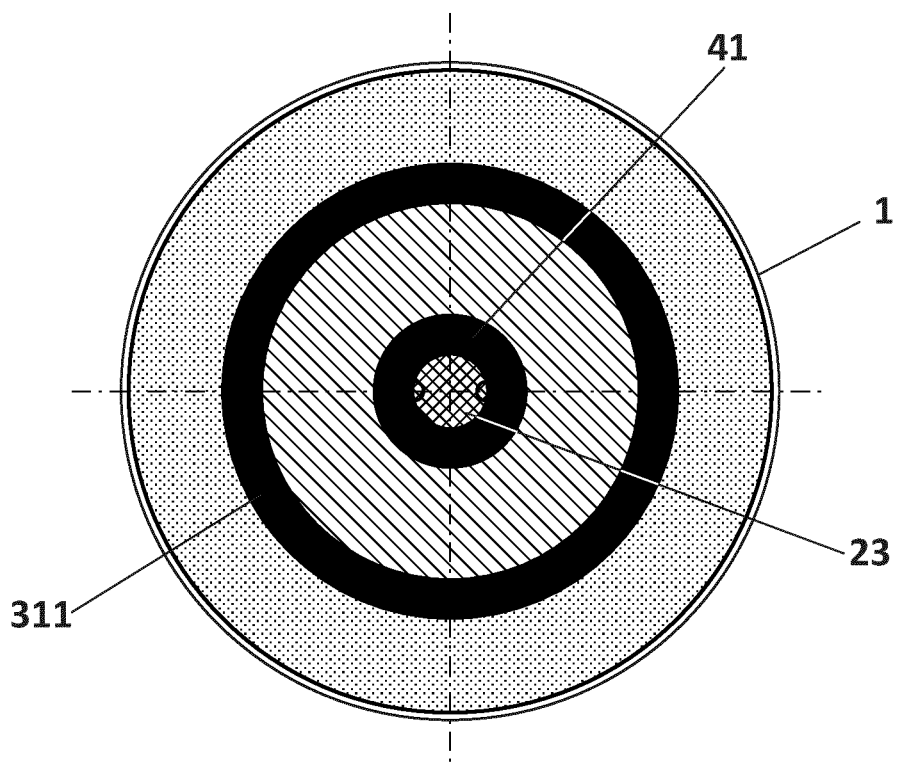
Figure 3C:
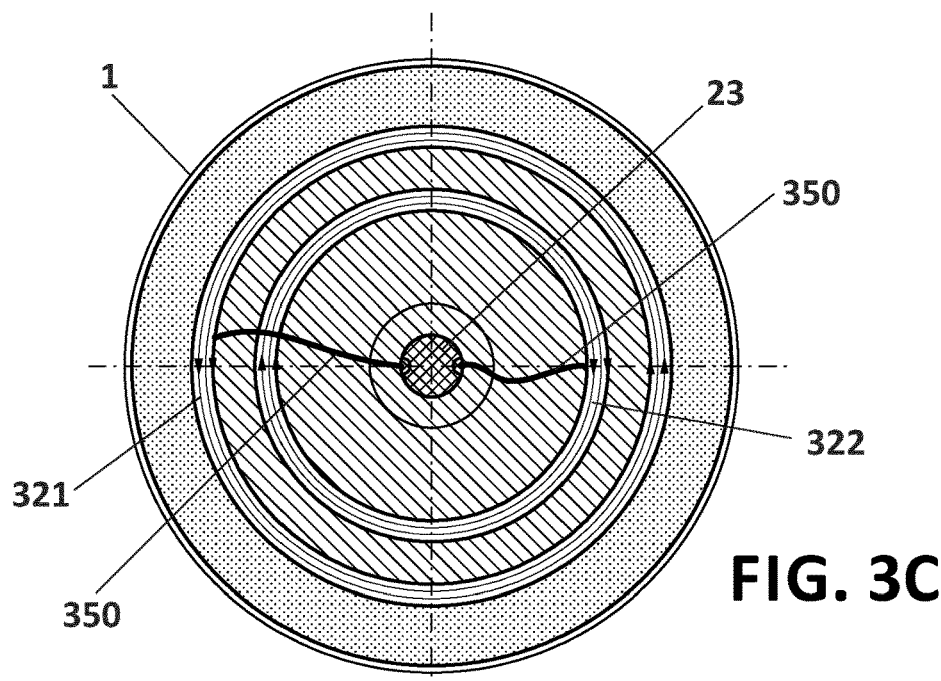
Figure 3D:
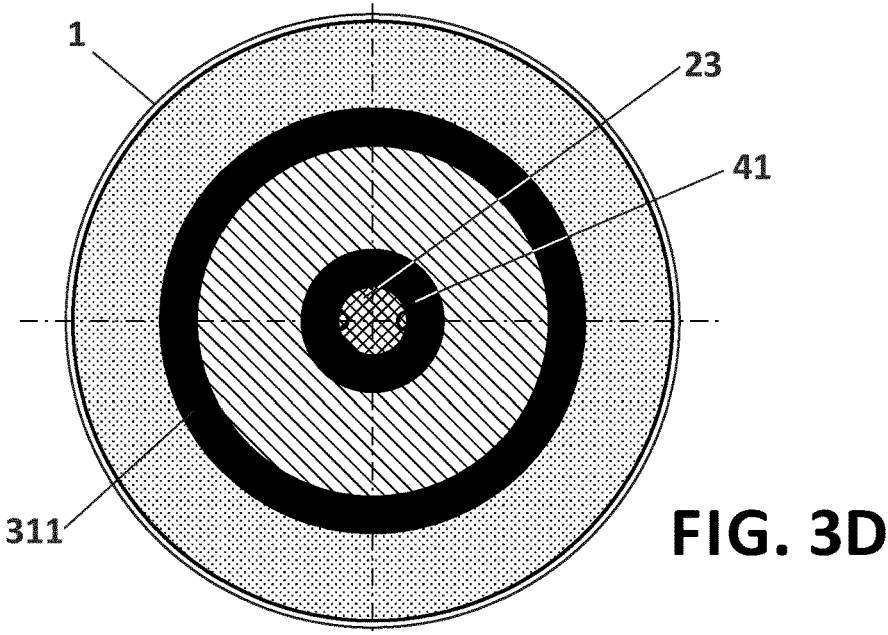
Figure 3E:
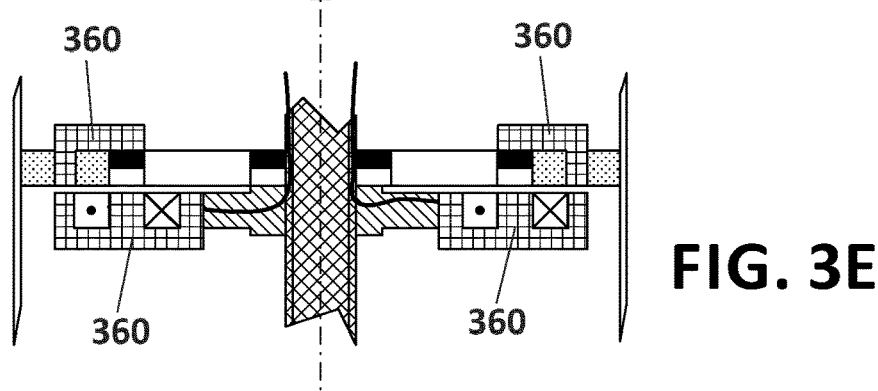
FIG. 3E is a schematic cross-sectional view of an alternative arrangement in which ferromagnetic material has been added to conduct the field lines in a suitable manner.

On the other hand, annular magnets 311 (for example, each formed by a plurality of individual magnets arranged one after the other in a ring) are provided above and below the coils. In this case, both annular magnets 311 have their N pole (black) directed upwards and their S pole (white) directed downwards. A magnetic field is established between the upper and the lower annular magnet, and when the first part oscillates, the magnets will move in relation to the fixed coils, so that the coils will be subjected to a varying magnetic field. As easily understood from FIG. 3A, the electromotive force induced in the outermost coil 321 when the first part 1 inclines in one direction will be opposed to the electromotive force induced in the innermost coil 322 at the same time, but due to the way in which the coils are interconnected (as discussed above; cf. also FIG. 3C), the generated current will correspond to the sum of the electromotive forces induced in the two coils. FIGS. 3B and 3D schematically illustrate the distribution of the magnets of FIG. 3A, and FIG. 3C schematically illustrates the arrangement of the coils. FIG. 3E schematically illustrates an alternative arrangement in which ferromagnetic material 360 has been added to conduct the field lines in a suitable manner.

Additionally, further annular magnets 41 are provided on the fixed second part, that is, on the projection 23. As understood from FIG. 3A, due to their orientation, there is a repulsive force between these magnets 41 and the magnets 311 attached to the first part, and this repulsive force increases when the magnets approach each other during the oscillating movement, as explained above. Thus, these magnets can serve to constitute a passive system for adaptation of the natural frequency of oscillation of the first part to the wind speed, as explained above. More specifically, when the first part 1 oscillates in relation to the base, a portion of the annular magnet 311 mounted on the first part approaches a portion of the annular magnet 41 mounted on the static structure 2, while on the diametrically opposite side of the first part, a portion of the magnet 311 moves away from the corresponding portion of the magnet 41. The repulsion force between the magnets 311 and 41 is inversely proportional to the square of the distance between the magnets 311 and 41. When the wind increases, the amplitude of the oscillatory movement of the first part tends to increase, whereby the magnets 311 and 41 tend to get closer and closer during the part of maximum approach of each oscillation cycle and therefore, the maximum repulsion force produced between the magnets 311 and 41 in each oscillation cycle increases accordingly. The increase of this repulsion force increases the resonance frequency of the structure. In this way, the very structure of the generator of FIG. 3A, with its magnets 311 and 41, contributes to an automatic increase in the resonance frequency of the pole when the wind speed increases and vice versa. In this way, by properly selecting and arranging the magnets 311 and 41, something that can be done by trial and error tests and/or by computer simulations, the automatic adjustment of the natural oscillation frequency of the pole to wind speed can be achieved, such that it is always tuned with the frequency of appearance of vortices, thereby achieving a good uptake of energy from the movement of the fluid. In other words, a function of the magnets 311 and 41 may be to obtain the automatic tuning between the natural oscillation frequency of the pole and the frequency of appearance of vortices.

In other words, for example, both the oscillating pole 1 and the stationary part 2 are provided with magnets, for example, in the shape of magnetic rings or sets of individual magnets arranged in the shape of a ring, arranged coaxially and in such a way that the magnets tend to repel each other. Thereby, the oscillating movement of the first part is not only influenced by the vortices but also by the magnetic forces, so that the natural oscillation frequency of the pole increases as the amplitude of oscillation increases.

As follows from what has been explained above, in an embodiment of the disclosure as the one of FIGS. 1A and 3, the second (static) part has a function corresponding to that of the stator of a non-conventional alternator designed to produce energy without the use of any bearing or reduction gearbox and that can produce power regardless of the direction in which the rod 5 is flexed. A large number of rows of coils and magnets such as those of FIGS. 3A-3E can be provided, whereby the magnets 41 contribute both to the production of power and to the "auto-tuning" of the generator to wind speed.

Figure 4A:
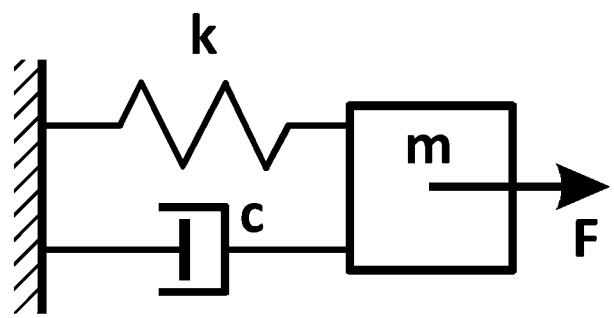
FIGS. 4A and 4B illustrate two simplified models of the behaviour of the first part without any tuning system (FIG. 4A) and with a tuning system (FIG. 4B), respectively.
Figure 4B:
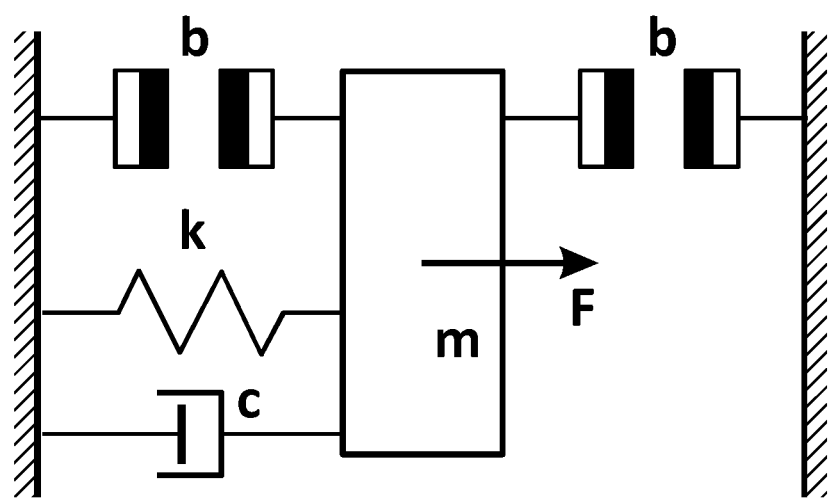

FIGS. 4A and 4B illustrate schematically the behaviour of a pole or first part without any tuning system (FIG. 4A) and the behaviour of a pole with the tuning system according to a possible embodiment of the disclosure (FIG. 4B).

The advantage of the tuning mechanism is to modify the natural oscillation frequency of the equipment according to the speed of the fluid. When the device has no tuning system, its movement can be modelled as the one of a damped simple harmonic oscillator (a) (FIG. 4A):

$$m \cdot \ddot{x} + c \cdot \dot{x} + k \cdot x = 0 \qquad \text{a)}$$

where m is its mass, c is the damping constant including the structural damping of the device itself, other losses and the mechanical energy converted into electrical energy and k is the elasticity constant of the elastic rod. In this case, the natural oscillation frequency of the equipment is:

$$w_0 = \sqrt{\frac{k}{m}} \qquad \text{b)}$$

When, given the generation of vortices, the oscillating pole is affected by the sinusoidal force F with maximum value $F_0$ (proportional to the square of the frequency if the value of the lift coefficient is considered constant), a delay in φ and frequency w=2·π·f(w[rad/s], f[Hz]), the movement can be modelled as the one of a forced damped harmonic oscillator:

$$m \cdot \ddot{x} + c \cdot \dot{x} + k \cdot x = F = F_0 \cdot \cos(wt + \varphi) \qquad \text{c)}$$

When the frequency w coincides with the natural frequency of the equipment wo, the latter enters in resonance and experiences a remarkable increase in its ability to absorb energy from the fluid.

As the frequency w is proportional to the speed of the fluid, in principle, given that the device has only one natural oscillation frequency (in the first oscillation mode), there will only be one single speed at which the device would work. However, the profit that can be obtained by for example a wind power generator is related to the number of hours/year during which the generator is running, producing electrical power. As explained above, there is a small range of wind speeds (the aerodynamic phenomenon of lock-in) in which an equipment based on the Karman vortices can maintain its resonance, but this is far smaller than desirable for a reasonably competitive generator.

In order to be able to increase this range of wind speeds, a tuning mechanism can be incorporated that modifies the oscillation frequency of the device. Thus, the pole will oscillate at greater frequency in the presence of higher wind speed, or in other words, in the presence of an increase in the frequency of appearance of vortices.

The arrangement of FIG. 4B differs from that of FIG. 4A by the addition of two pairs of magnets in repulsion mode. The movement of this model can be described by the following expression:

$$m \cdot \ddot{x} + c \cdot \dot{x} + k \cdot x + \frac{b}{(d-x)^2} - \frac{b}{(d+x)^2} = F \qquad \text{d)}$$

where b would include (the Coulomb law for magnetism), the inverse of the magnetic permeability and the product of the magnetic masses, d is the distance at rest between each pair of magnets.

Figure 5:
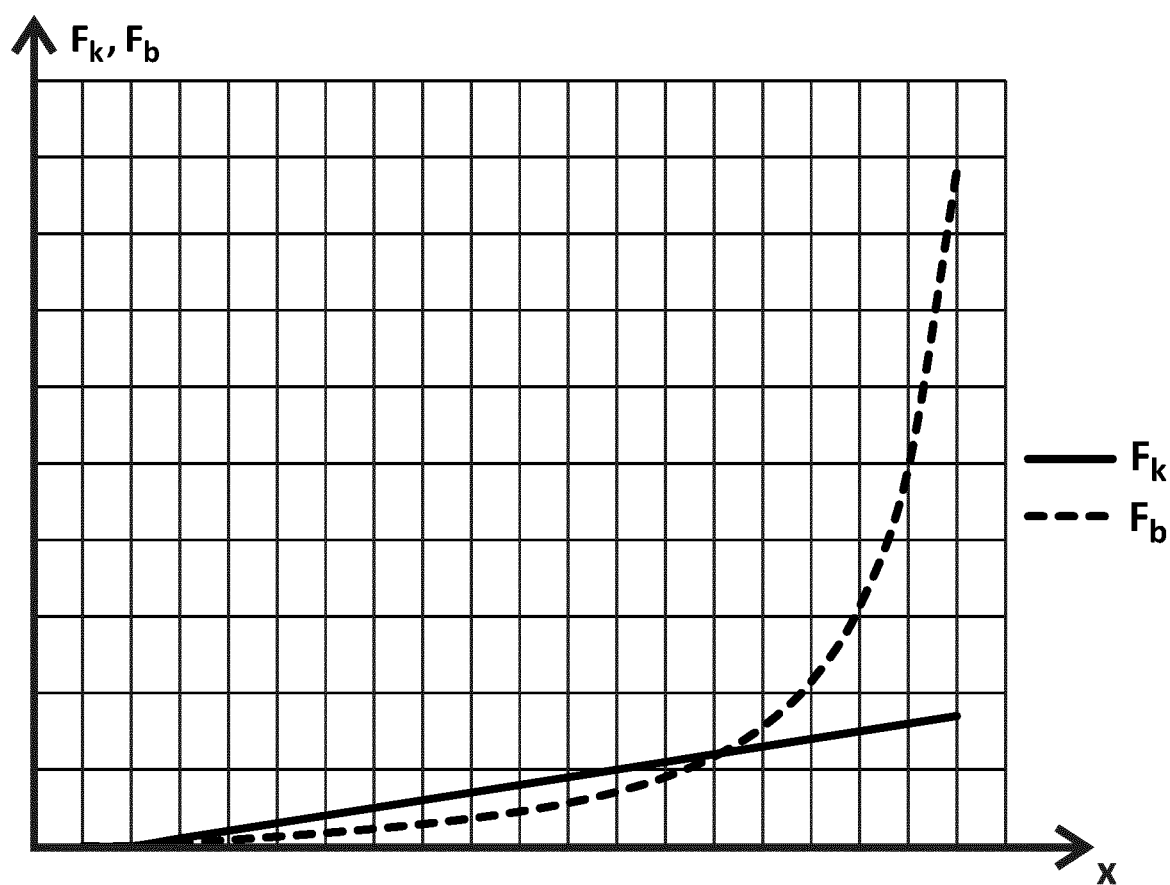
FIG. 5 represents the evolution against displacement (x) of the spring force ($F_k$) and of the magnetic repulsion force (Fb)

As shown in FIG. 5, the evolution with the displacement x of the spring force $F_k$ produced on the mass by deformation of the rod and the joint force produced by the two pairs of magnets Fb are very different. As it can be seen and as already mentioned, as the mass (the pole) moves, near its neutral position of zero bending the spring force is predominant against the magnetic forces. As the displacement increases, its influence begins to equalise and in high displacements, the predominant force is of magnetic origin.

This has several implications.

Figure 6:
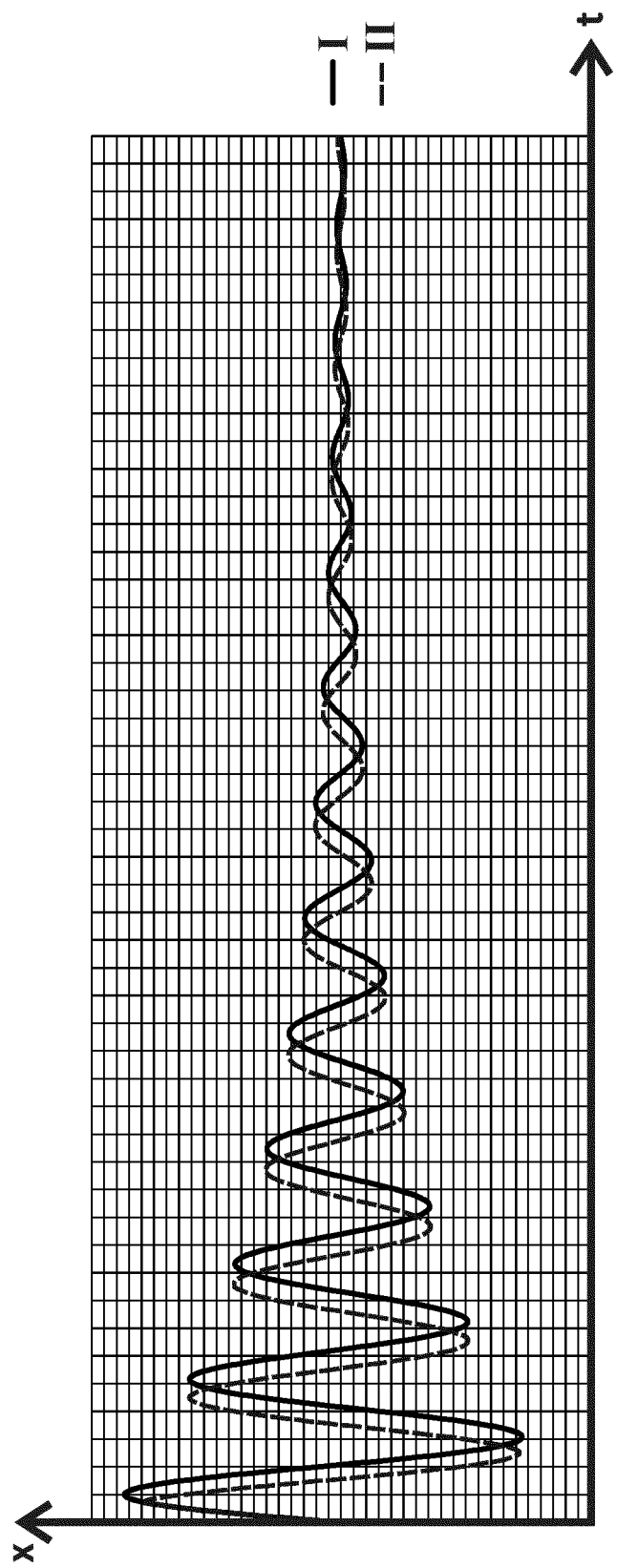
FIG. 6 represents the variation over time of the amplitude (displacement x) and frequency (oscillation along the time axis t) of a device without tuning (I) and a tuned device (II) (movement with magnetic repulsion) when subjected to the action of an instantaneous force in the initial instant.

The kinetic energy of the oscillating pole when it passes through its neutral position of zero bending depends in both cases on the square of its mass and its speed. Not so with the stored potential energy when its displacement is maximum. In the case represented in FIG. 4A, the potential energy is only elastic potential energy and in the case represented in FIG. 4B, the potential energy will have both an elastic and a magnetic nature with the difference that the potential energy of magnetic origin increases with the cube of the displacement and not with the square. As shown in FIG. 6, in comparison with the damped simple harmonic movement (I) for large displacements, the trajectory of the movement with magnetic repulsion (II) suffers an increase in its frequency of oscillation. With small displacements (on the right side of the graph), where almost all the potential energy is accumulated by the elastic rod, both trajectories have a very similar size period.

FIGS. 7A-7D are views analogous to the views of FIGS. 3A-3D, but of an embodiment featuring an alternative arrangement of magnets and coils. Here, the subsystem for converting the movement into electrical power comprises, at the illustrated level of the system, one coil 323. This coil is arranged between two annular magnets (in other embodiments, there can be more coils per level, and as suggested in FIG. 1A, the subsystem can comprise multiple levels of coils 323 and magnets 312). In this embodiment, and differently from the arrangement of FIGS. 3A-3D, the annular magnets are arranged with their N pole and S pole arranged radially outwards or inwards, rather than up/down. It is clear from FIG. 7A how the oscillating movement will displace the magnets 312 radially, thereby inducing an electromotive force into the coil 323. Also, in this embodiment magnets 42 are provided for "auto-tuning" the natural frequency of oscillation of the first part. In this case, these magnets 42 are likewise oriented with the N pole and S pole radially rather than vertically.

Figure 7A:
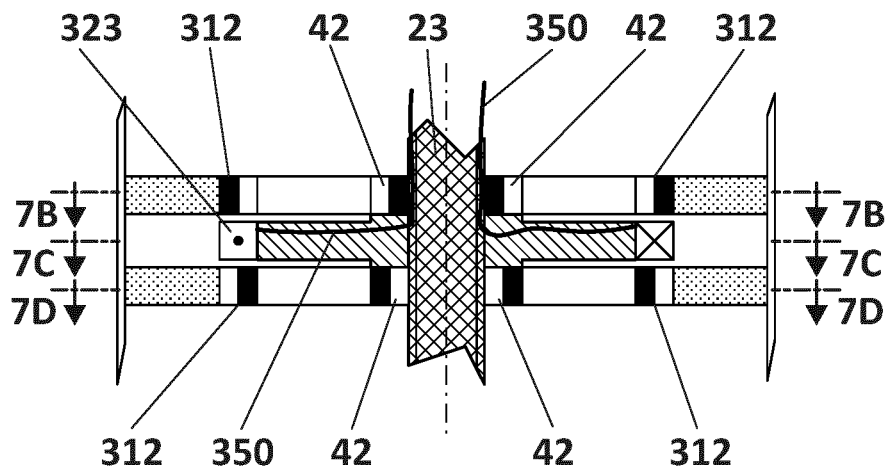
FIGS. 7A-7E are view analogous to the ones of FIGS. 3A-3E, but of an alternative arrangement of coil and magnets.
Figure 7B:
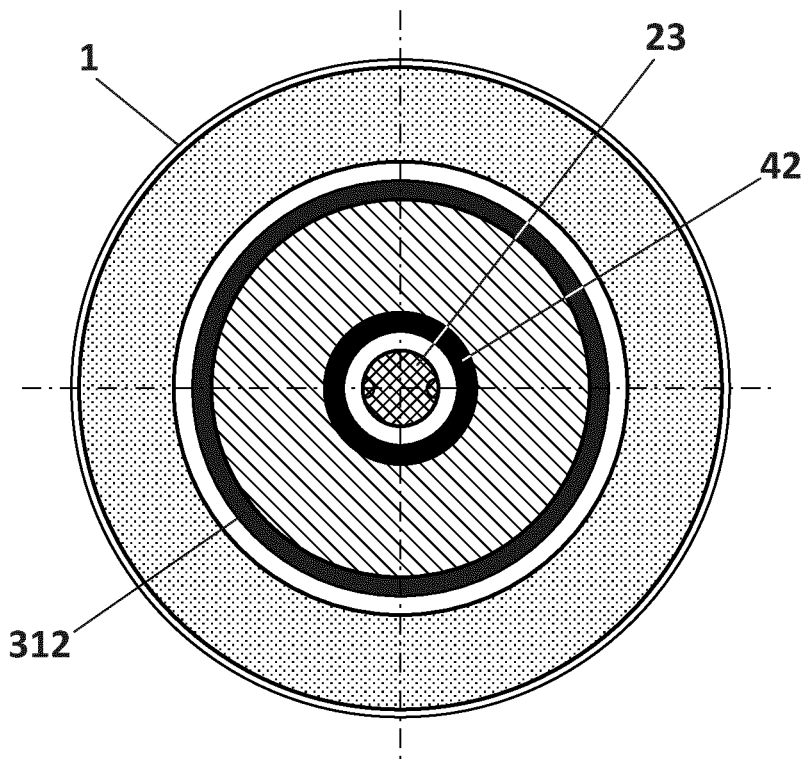
Figure 7C:
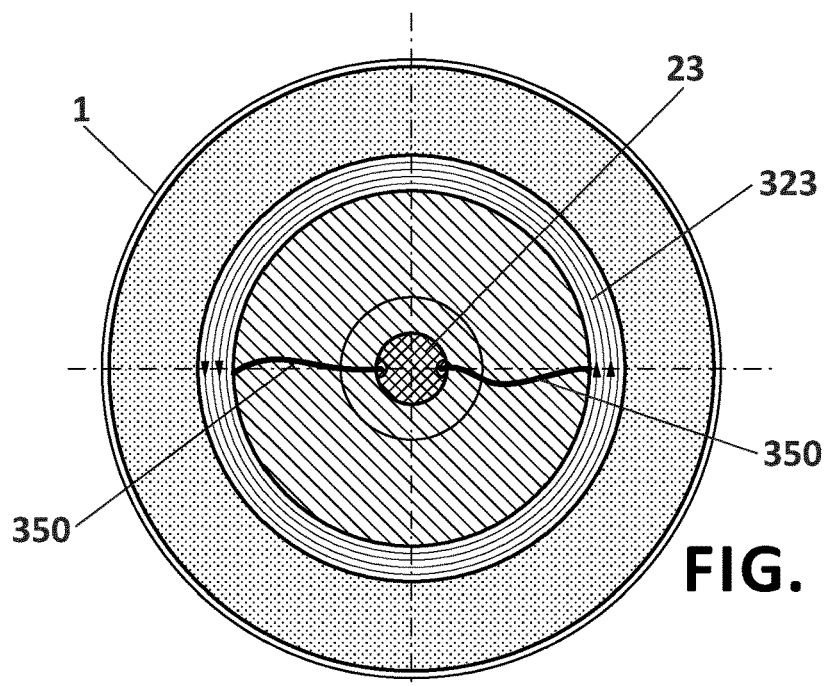
Figure 7D:
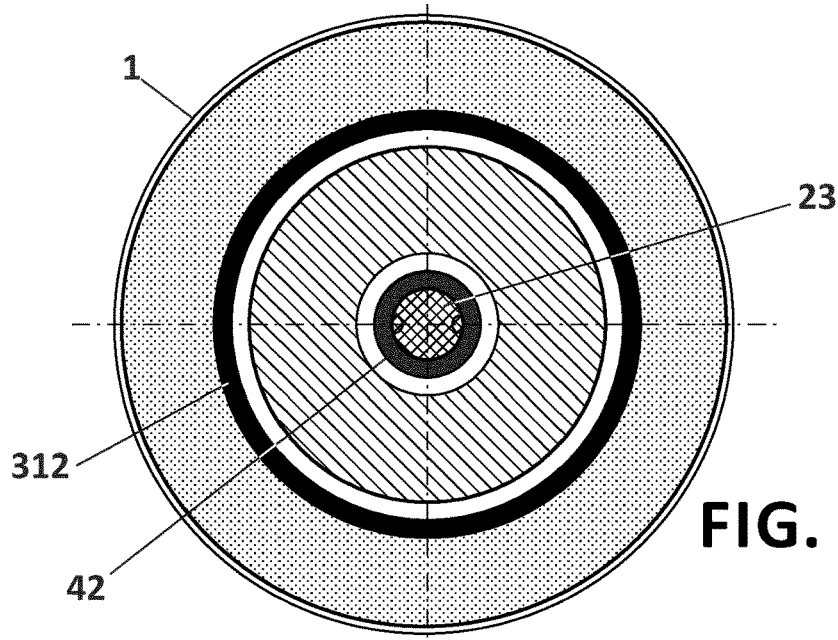
Figure 7E:
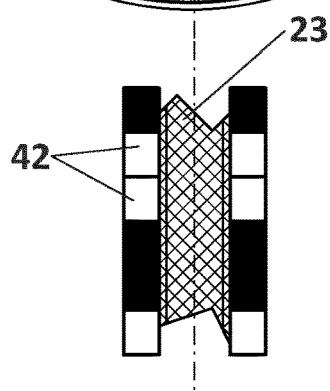

Regarding the annular magnets, such as magnets 42, in some embodiments these magnets are formed by several individual magnets arranged in a ring, but in other embodiments these magnets consist of a single ring-shaped magnet. In such cases, it has been found that it may be cheaper to obtain ring-shaped magnets with the N and S poles oriented in the axial direction (as in annular magnet 41 of FIG. 3A) rather than in the radial direction (as in the case of magnet 42 of FIG. 7A). Thus, in order to reduce the costs involved, one possibility can be to obtain a magnet with a radially oriented S (or N) pole by positioning one magnet with axially arranged poles on top of another one, as schematically illustrated in FIG. 7E.

Figure 8A:
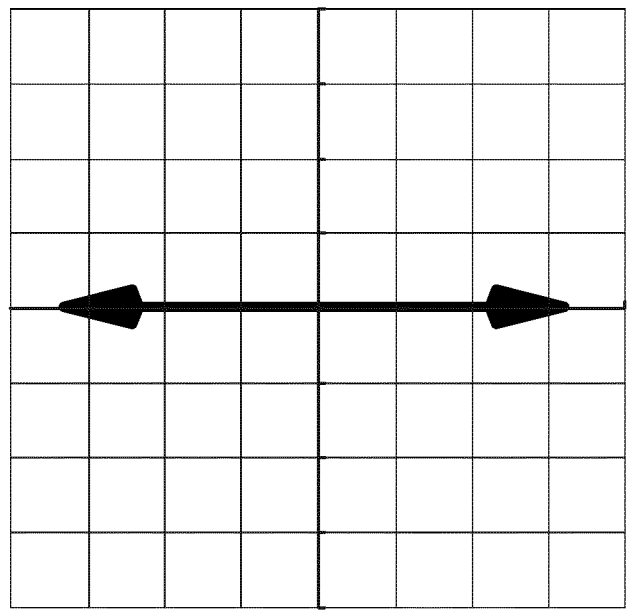
FIGS. 8A and 8B schematically illustrate the oscillatory movement of the first part in two different embodiments or modes of operation of the disclosure.
Figure 8B:
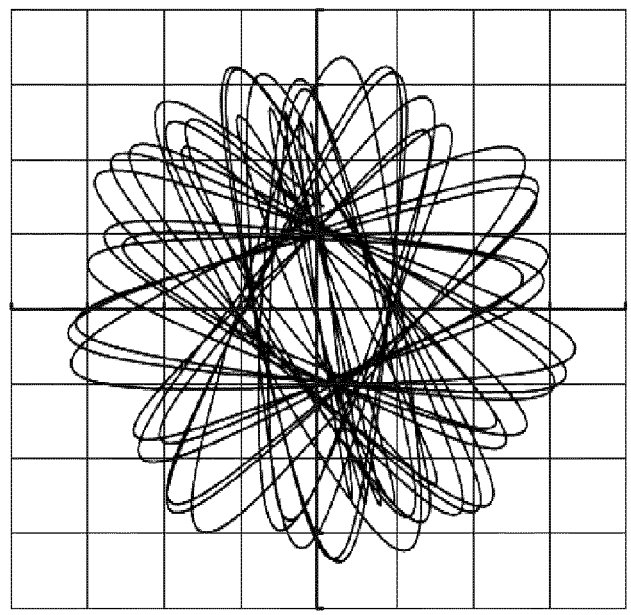

Theoretically, when the fluid moves in a constant direction, such as when the wind blows constantly in one direction, the projection of the oscillatory movement of the first part on the horizontal plane is linear, as shown in FIG. 8A. However, it has been observed that sometimes, and apparently especially when a magnetic auto-tuning arrangement as explained above is used, the first part will oscillate but not only in one vertical plane, but in an apparently randomized way, as schematically illustrated in FIG. 8B. That is, the movement when projected onto the horizontal plane is not only linear, but has also a rotational component.

Figure 8C:
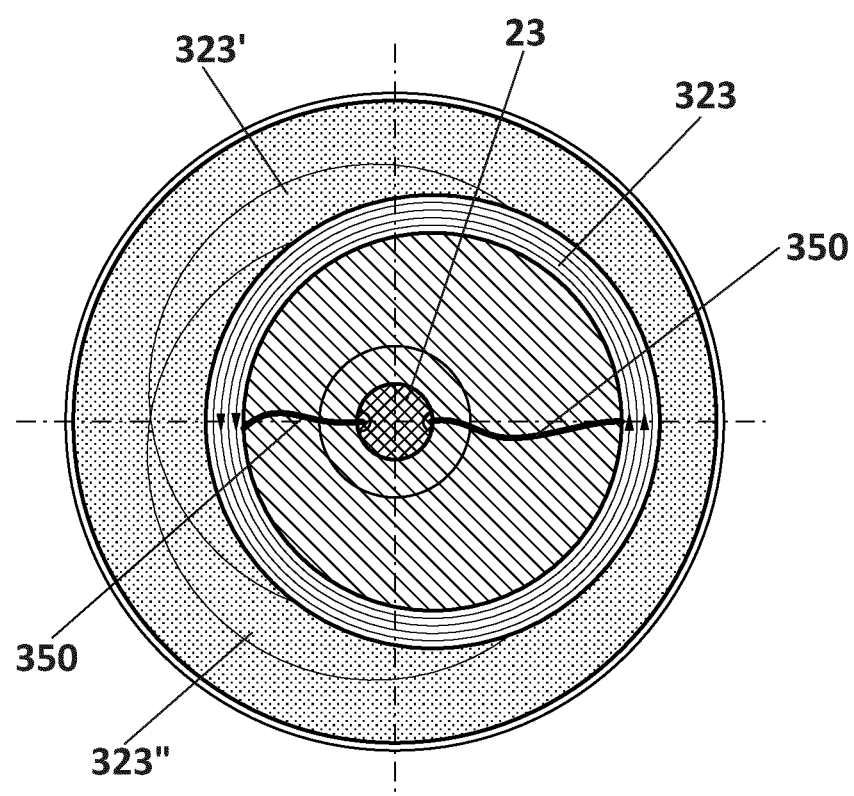
FIG. 8C schematically illustrates the arrangement of the coil in relation to the longitudinal axis of the generator in accordance with an alternative embodiment of the disclosure.

Although it may be desirable to prevent the first part from oscillating as per FIG. 8B, it has been found that also in this kind of oscillation mode energy can be extracted from the movement. However, it has been found that in such cases and in order to optimise the extraction of electrical power when using coils arranged in the horizontal plane as per FIG. 3A-3E or 4A-4D, it may be advantageous to arrange the coils so that their centers do not coincide with the longitudinal axis 2000 of the generator. This kind of arrangement is schematically illustrated in FIG. 8C, where the coil 323 is asymmetrically arranged in relation to the projection 23, that is, in relation to the longitudinal axis 2000 of the generator (cf. FIG. 1A). Also, two further coils 323' and 323", arranged in other horizontal planes than the coil 323, are schematically suggested in FIG. 8C. These coils are axially displaced in relation to the coil 323, that is, they correspond to different "levels" of the subsystem for converting movement into electrical power. The centers of the coils 323' and 323" are also radially displaced in relation to the projection 23. The three coils 323, 323' and 323" are offset in different radial directions, with an angular spacing of 120°, as schematically illustrated in FIG. 8C.

On the other hand, for example as an alternative to the approach suggested above, a controlled injection or extraction of energy into/out of the subsystem(s) 3 for converting the oscillating movement of the first part into electrical energy can be used to keep the oscillation of the first part substantially in one vertical plane, that is, to prevent oscillation as per FIG. 8B.

In this text, the term "subsystem" in the expression "subsystem for converting the oscillating movement of the first part into electrical energy" or similar should not be interpreted in any limited sense. In the field of conventional wind turbines, the expression "generator" is frequently used for the part of the overall wind turbine that converts the mechanical or kinetic energy into electrical energy. In the present document, the term "generator" is used to denote the global system including the first part, that is, the part that interacts with the primary energy source, for example, the wind, to capture energy. In order to avoid confusion, the term "generator" has thus not been used for the subsystem for converting the oscillating movement of the first part into electrical energy. However, this subsystem can obviously be regarded as a generator, as it generates electrical energy. Also, the generator can comprise more than one subsystem for converting movement into electrical energy. If there are more than one subsystem, not all of the subsystems have to be arranged as described above.

In this text, the term "magnet" generally refers to a permanent magnet, although whenever appropriate also electromagnets may be used, as readily understood by the person skilled in the art.

In this text, the term "annular" when applied to magnets does not require that the magnet in question be a completely "annular" magnet made up of one single annular element. Rather, the term "annular" refers to the general configuration of the magnet, but not to its constitution. That is, an "annular magnet" in the context of the present document can be made up of a plurality of individual magnets, substantially arranged in a circle, with or without space between the individual magnets. The space can be substantial, as long as it does not deprive the set of magnets in question from forming a general circular configuration. The person skilled in the art will use components considering aspects such as cost of the components and cost of their installation. The same applies to references to a magnet shaped as a "ring".

In this text, terms as "above", "below", "vertical", "horizontal", etc., generally refer to a situation in which the elongated first part is arranged with its first end below its second end, that is, generally, with a longitudinal axis of the first part extending vertically. However, this should not be interpreted to imply that the first part must always be arranged in this way. In some implementations, other orientations of the first part are possible.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. An electrical power generator comprising:
   a first part, the first part having an elongated shape, a first end, and a second end, the first part being attached to a base adjacent the first end, the first part configured to be located in a fluid and configured such that, when said fluid moves, the first part generates vortices in said fluid so that a lift force is generated on the first part by the vortices in said fluid and said lift force produces an oscillating movement of the first part;
   a subsystem for converting the oscillating movement of the first part into electrical power; and
   a second part extending from the base in an axial direction;
   wherein the subsystem is at least partially housed within the first part;
   wherein the subsystem comprises at least one first subsystem component and at least one second subsystem component, wherein the electrical power is produced by an oscillating movement of the first subsystem component relative to the second subsystem component,
   wherein the first subsystem component is attached to the first part and the second subsystem component is attached to the second part, so that the oscillating movement of the first part produces the oscillating movement of the first subsystem component relative to the second subsystem component;
   wherein at least one of the first subsystem component and the second subsystem component comprises at least one magnet, and
   wherein at least another one of the first subsystem component and the second subsystem component comprises at least one coil, arranged so that the oscillating movement of the first subsystem component relative to the second subsystem component generates an electromotive force in the at least one coil by relative displacement between the at least one magnet and the at least one coil, so as to produce the electrical power by causing a current to flow,
   wherein the at least one coil comprises two coils arranged in a common plane and surrounding an axis of the second part, one of the two coils being external to the other one of the two coils, the two coils being connected in series so that when the current circulates in a clockwise direction through one of the two coils, the current subsequently circulates in a counter-clockwise direction through the other one of the two coils, and vice-versa.

2. The electrical power generator according to claim 1, wherein said at least one magnet is configured for generating a magnetic field which produces a magnetic repulsion force between the first part and the second part, said at least one magnet also forms part of the subsystem for converting the oscillating movement of the first part into electrical power.

3. An electrical power generator comprising:
   a first part, the first part having an elongated shape, a first end, and a second end, the first part being attached to a base adjacent the first end, the first part configured to be located in a fluid and configured such that, when said fluid moves, the first part generates vortices in said fluid so that a lift force is generated on the first part by the vortices in said fluid and said lift force produces an oscillating movement of the first part;
   a subsystem for converting the oscillating movement of the first part into electrical power; and
   a second part extending from the base in an axial direction;
   wherein the subsystem is at least partially housed within the first part;
   wherein the subsystem comprises at least one first subsystem component and at least one second subsystem component, wherein the electrical power is produced by an oscillating movement of the first subsystem component relative to the second subsystem component,
   wherein the first subsystem component is attached to the first part and the second subsystem component is attached to the second part, so that the oscillating movement of the first part produces the oscillating movement of the first subsystem component relative to the second subsystem component;
   wherein the first part is attached to the base via an attachment element arranged to be repetitively deformed or displaced by the oscillating movement of the first part,
   wherein both the attachment element and the second part extend into the first part, such that the second part at least partially surrounds the attachment element inside at least a section of the first part.

4. The electrical power generator according to claim 3, wherein the subsystem is completely housed within the first part.

5. The electrical power generator according to claim 4, wherein the second end is at a distance H above the first end, and wherein the subsystem is placed at a distance of more than 0.05H above the first end.

6. The electrical power generator according to claim 3, wherein the subsystem comprises:
   at least one annular magnet or at least one annular coil arranged in a plane perpendicular to a longitudinal axis of the first part, wherein said annular magnet or said annular coil is asymmetrically positioned relative to the longitudinal axis.

7. The electrical power generator according to claim 3, further comprising at least one magnet configured for generating a magnetic field which produces a magnetic repulsion force between the first part and the second part, said at least one magnet also forms part of the subsystem for converting the oscillating movement of the first part into electrical power.

8. The electrical power generator according to claim 3, wherein the first part has a circular cross-section wherein a diameter of the first part increases with a distance from the first end along at least a major portion of the first part between the first end and the second end.

9. The electrical power generator according to claim 3, wherein the first part has a circular cross-section wherein a diameter of the first part varies along the first part between the first end and the second end, wherein a maximum value of said diameter is not more than 20% of a distance between the first end and the second end.

10. An electrical power generator comprising:
- a first part, the first part having an elongated shape, a first end, and a second end, the first part being attached to a base adjacent the first end, the first part configured to be located in a fluid and configured such that, when said fluid moves, the first part generates vortices in said fluid so that a lift force is generated on the first part by the vortices in said fluid and said lift force produces an oscillating movement of the first part;
- a subsystem for converting the oscillating movement of the first part into electrical power; and
- a second part extending from the base in an axial direction;
- wherein the subsystem is at least partially housed within the first part;
- wherein the subsystem comprises at least one first subsystem component and at least one second subsystem component, wherein the electrical power is produced by an oscillating movement of the first subsystem component relative to the second subsystem component,
- wherein the first subsystem component is attached to the first part and the second subsystem component is attached to the second part, so that the oscillating movement of the first part produces the oscillating movement of the first subsystem component relative to the second subsystem component;
- wherein the first part is attached to the base via a rod member extending from the base and into the first part, wherein the second part extends into the first part to a position axially beyond an end of the rod member.

* * * * *